(12) United States Patent
Guim Bernat et al.

(10) Patent No.: US 10,613,999 B2
(45) Date of Patent: Apr. 7, 2020

(54) DEVICE, SYSTEM AND METHOD TO ACCESS A SHARED MEMORY WITH FIELD-PROGRAMMABLE GATE ARRAY CIRCUITRY WITHOUT FIRST STORING DATA TO COMPUTER NODE

(71) Applicant: Intel Corporation, Santa Clara, CA (US)

(72) Inventors: Francesc Guim Bernat, Barcelona (ES); Thomas Willhalm, Sandhausen (DE); Karthik Kumar, Chandler, AZ (US); Daniel Rivas Barragan, Cologne (DE); Patrick Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 15/870,749

(22) Filed: Jan. 12, 2018

(65) Prior Publication Data

US 2019/0220424 A1    Jul. 18, 2019

(51) Int. Cl.
   *G06F 13/16*    (2006.01)
   *G06F 13/24*    (2006.01)
   *G06F 12/0837*  (2016.01)
   *G06F 12/0831*  (2016.01)

(52) U.S. Cl.
   CPC ...... *G06F 13/1663* (2013.01); *G06F 12/0831* (2013.01); *G06F 12/0837* (2013.01); *G06F 13/24* (2013.01)

(58) Field of Classification Search
   None
   See application file for complete search history.

(56) References Cited

U.S. PATENT DOCUMENTS

| | | | | |
|---|---|---|---|---|
| 2011/0004729 | A1* | 1/2011 | Akkawi | G06F 12/0813 711/130 |
| 2014/0331014 | A1* | 11/2014 | Liao | G06F 15/17306 711/147 |
| 2016/0314018 | A1* | 10/2016 | Kessler | G06F 9/4881 |
| 2017/0147422 | A1* | 5/2017 | Koktan | G06F 11/0757 |
| 2018/0088983 | A1* | 3/2018 | Demchenko | G06F 9/4843 |

* cited by examiner

*Primary Examiner* — Ann J Lo
*Assistant Examiner* — Chie Yew
(74) *Attorney, Agent, or Firm* — Green, Howard & Mughal LLP

(57) ABSTRACT

Techniques and mechanisms for providing a shared memory which spans an interconnect fabric coupled between compute nodes. In an embodiment, a field-programmable gate array (FPGA) of a first compute node requests access to a memory resource of another compute node, where the memory resource is registered as part of the shared memory. In a response to the request, the first FPGA receives data from a fabric interface which couples the first compute node to an interconnect fabric. Circuitry of the first FPGA performs an operation, based on the data, independent of any requirement that the data first be stored to a shared memory location which is at the first compute node. In another embodiment, the fabric interface includes a cache agent to provide cache data and to provide cache coherency with one or more other compute nodes.

23 Claims, 15 Drawing Sheets

200

210
With a FPGA of a first compute node, configuring a shared memory to include a memory region of a second compute node coupled to a fabric interface of the first compute node via a fabric

220
Sending from the FPGA a request to access the shared memory, wherein, based on a memory map, the request is sent to the fabric interface,

230
Communicating, from the fabric interface to the FPGA, a response to the request

240
Performing a task assigned to the FPGA, including processing data of the response, wherein the data is both received and processed at the FPGA independent of any storage of the data, based on the request, to any memory location of the first compute node which is represented in the address space

FIG. 2

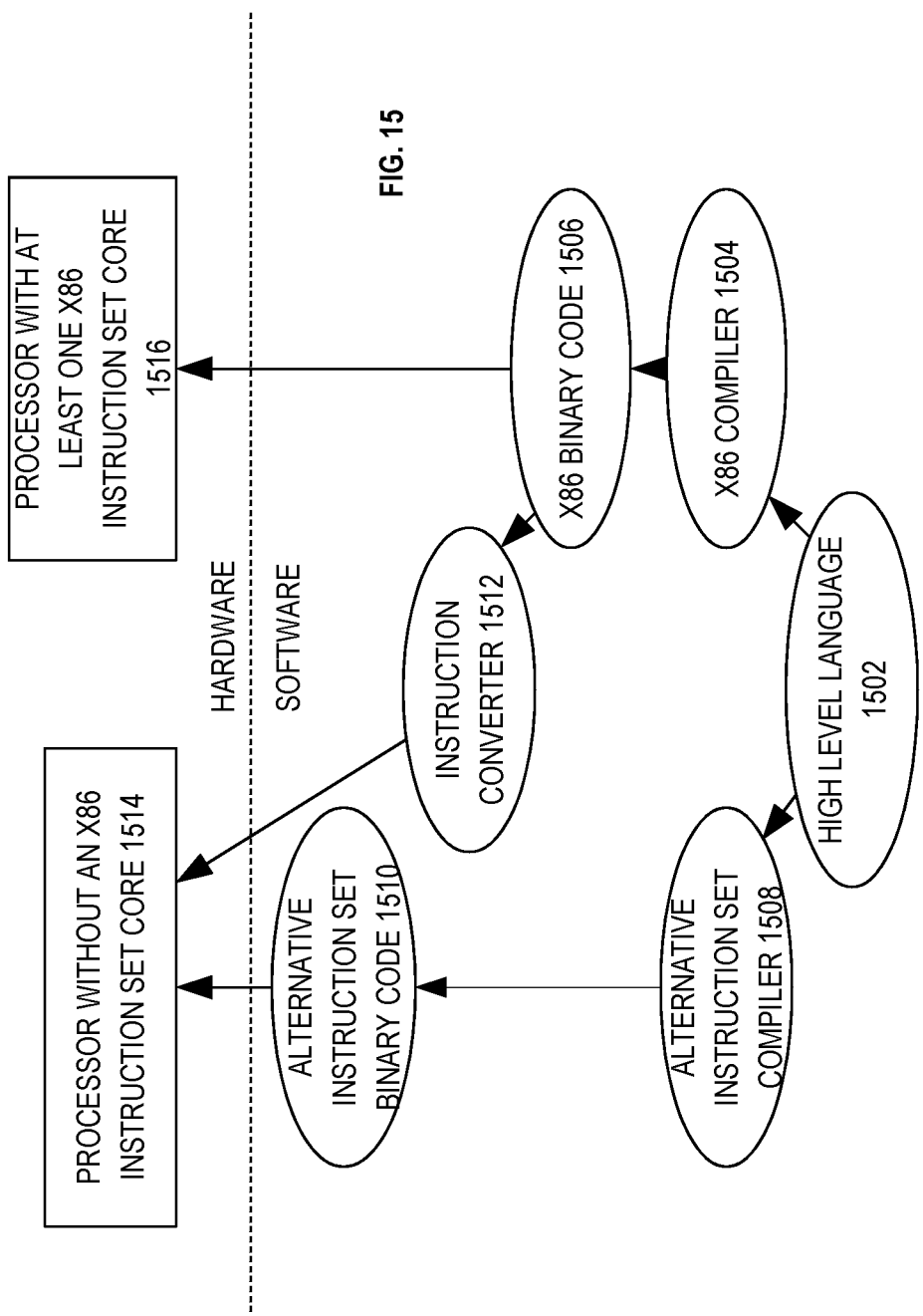

DEVICE, SYSTEM AND METHOD TO ACCESS A SHARED MEMORY WITH FIELD-PROGRAMMABLE GATE ARRAY CIRCUITRY WITHOUT FIRST STORING DATA TO COMPUTER NODE

BACKGROUND

1. Technical Field

Embodiments described herein generally relate to shared memory systems, and more particularly, but not exclusively, relate to accessing shared memory resources with a field-programmable gate array

2. Background Art

Signal processing, image processing, machine learning, and network accelerators are just some examples of applications which often rely on the use of a field-programmable gate array (FPGA). Some of these applications require large and/or fast computational capability, and often necessitate the use of multiple FPGAs situated in multiple compute nodes for real-time processing. In order to scale performance, a processing workload is often divided among multiple FPGAs, where a single FPGA would not be able to effectively handle all complex algorithms of the workload. When such work needs to be divided, there is usually a producer and consumer model, wherein computer nodes function as consumers which receive work tasks provided by a producer. Such models typically use tables, or other such data, which needs to pass back and forth between the respective memories of compute nodes for subsequent processing.

The need to store first data to a memory of a compute node, prior to use of that data by a FPGA for a particular task, is a source of data latency. Many applications are thus limited by the speed of access that a FPGA has to data in remotely connected memory resources. This tends to result in a type of data latency which, increasingly, poses a barrier to the adoption of FPGAs in next-generation technologies. Even in some simple architectures, communicating data over an interconnect such as a PCIe bus involves operational overhead that is unacceptable.

Data volumes are growing massively each year, and datasets in many applications are already too large to fit in a single compute node. It is expected that the sizes of datasets needed in next-generation applications will more frequently exceed amounts that can currently be supported on an individual compute node. It is also expected that, due to data access latency, parallel processing solutions using multiple compute nodes will be too slow to handle such large datasets.

BRIEF DESCRIPTION OF THE DRAWINGS

The various embodiments of the present invention are illustrated by way of example, and not by way of limitation, in the figures of the accompanying drawings and in which:

FIG. 2 is a flow diagram illustrating elements of a method to access a shared memory with a field-programmable gate array (FPGA) according to an embodiment.

FIG. 15 is a block diagram contrasting the use of a software instruction converter to convert binary instructions in a source instruction set to binary instructions in a target instruction set according to embodiments of the invention.

DETAILED DESCRIPTION

Embodiments discussed herein variously provide techniques and mechanisms for a field-programmable gate array (FPGA) of a compute node to more directly access a memory region of another compute node. Such access may be via an interconnect fabric (for brevity, "fabric" herein) which is coupled between the compute nodes. Currently, a FPGA of a given compute node must wait for data to be stored to a local physical memory of the compute node before such data is available for use by the FPGA to perform an assigned task. Often, this storing is also associated with extensive software involvement.

Some embodiments avoid or otherwise mitigate these inefficiencies by variously extending FPGA functionality (and, in some embodiments, fabric interface functionality) of existing compute node architectures, enabling the respective FPGAs of multiple compute nodes to expose and more directly share physical memory. This extended functionality may allow a FPGA of one compute node to access a common and coherent address space with which a memory region located in another compute node is exposed. In some embodiments, a FPGA and a fabric interface of a compute node operate (e.g., where a processor of the compute node is optional) to provide an address space of a data center which is shared by multiple FPGAs across a fabric. The FPGA may be able to receive data from another compute node (or a cached version of such data) without any need for the data to first be written to a physical memory of the computer node. Cooperative work by multiple FPGAs may thus be faster or otherwise more efficient, and may leverage one or more existing IP blocs, existing interface standards and/or existing protocols.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including multiple compute nodes coupled to one another via a fabric.

Figure 1:
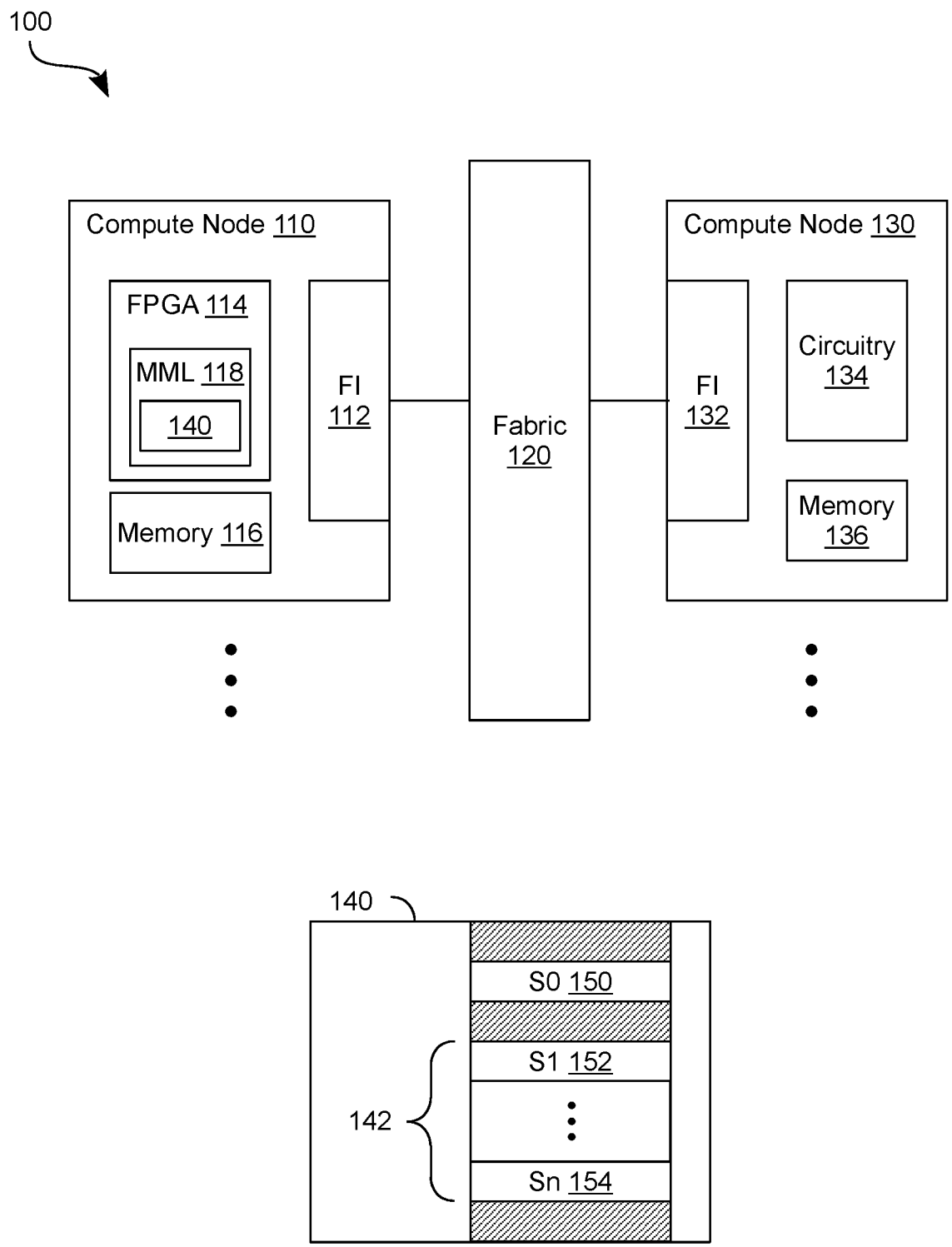
FIG. 1 is a functional block diagram illustrating elements of a system to share memory resources among multiple compute nodes according to an embodiment.

FIG. 1 shows features of a device 100 to provide a FPGA of a first compute node with access to a shared memory resource of a second compute node. Such access may enable data which is stored at the memory resource (or a cached version of such data) to be received and processed by the FPGA—e.g., where such receiving and processing does not require any prior writing of the data to a local memory of the first compute node. In an embodiment, device 100 includes only a single integrated circuit (IC) chip such as a system-on-chip, or "SoC." Alternatively, device 100 may comprise multiple IC chips which, for example, are included in a single package. In other embodiments, device 100 includes multiple packaged components coupled to one another via interconnect structures of a printed circuit board.

As used herein, "compute node" refers to a set of interconnected resources which include a memory, circuitry to perform one or more computations of a given task, and an interface (referred to herein as a "fabric interface") by which the compute node is to couple to a fabric for communication with one or more other compute nodes. The circuitry to perform a task may include a FPGA and/or a processor, although in some embodiments, at least one or more compute nodes each include a respective FPGA.

As shown in FIG. 1, device 100 may include a fabric 120 and compute nodes 110, 130 coupled to one another via fabric 120. System 100 may additionally or alternatively include more and/or differently configured compute nodes, in other embodiments. Fabric 120 may include any of a variety of one or more buses, switches, and/or networks configured to support transmission of network traffic between compute nodes—e.g., using communications which are compatible with and/or are an extension of any of various interconnect protocols and/or network protocols. For example, fabric 120 may facilitate communication functionality which is compatible with any of various Peripheral Component Interconnect (PCI) Express (PCIe) Specifications, such as the PCIe 3.0 released by the PCI Special Interest Group on Nov. 10, 2010. Alternatively or in addition, fabric 120 may support communication functionality such as that provided by the Omni-Path interconnect architecture from Intel Corporation of Santa Clara, Calif., USA. However, some embodiments are not limited to a particular protocol or protocols that might be utilized to facilitate network traffic in an interconnect fabric. In use, fabric 120 may be utilized by multiple compute nodes to communicate data variously stored, cached and/or otherwise maintained by a memory system (referred to herein as a "shared memory") which is shared by two or more compute nodes, and which spans fabric 120.

Compute node 110 may comprise a fabric interface (FI) 112 by which compute node 110 is coupled to fabric 120—e.g., wherein compute nodes 130 similarly comprises a FI 132 coupling compute node 130 to fabric 120. Fabric 120 may facilitate signal communication between FI 112 and FI 132—e.g., to enable the configuration and/or accessing of a shared memory which, for example, includes respective memory resources of computer nodes 110, 130.

For example, compute node 110 may further comprise a FPGA 114, circuitry of which is to perform one or more tasks assigned to compute node 110. Performance of such one or more tasks may result in, or be based on, one or more requests from FPGA 114 to access memory resources of system 100. These memory resources may include a region of a memory 136 of compute node 130—e.g., wherein memory 136 is also available for use by circuitry 134 (such as another FPGA) of computer node 130. In some embodiments, the memory resources further include some or all of a memory 116 of compute node 110. To facilitate efficient access to the region of a memory 136, other circuitry of FPGA 114—e.g., including the illustrative memory management logic (MML) 118 shown—may enable access to a shared memory which spans fabric 120. Although MML 118 is shown as a single module, various functionalities of MML 118 described herein may alternatively be provided each with a respective distinct circuit unit of FPGA 114.

MML 118 may include circuitry which is configured to facilitate the configuration and/or accessing of a shared memory. In one embodiment, MML 118 provides functionality to register one or more remote memory regions as belonging to the shared memory. For example, MML 118 may be coupled to receive via FI 112 a message (e.g., from a counterpart MML of circuitry 134) which indicates that at least some region of memory 136 is available to be included in a shared memory. Such a message may specify or otherwise indicate a size of the available memory region and/or may indicate addresses which are to be used for targeting memory locations of the available memory region. In response to such a message, MML 118 may create, update or otherwise configure a state of memory mapping to enable addressing of the available memory region of compute node 130 as part of the shared memory.

For example, memory mapping state of compute node 110 may be configured to enable address conversion functionality whereby an address which (according to one addressing scheme) is to target of an available memory location of memory 136 may be converted another address to target that memory location according to a different addressing scheme. Such address conversion may include converting between a physical address and a virtual address, and/or converting between different virtual addresses, for example. To facilitate address conversion functionality, the MML 118 may include or couple to a table or other data structure, wherein items (e.g., table entries) of the data structure each specify or otherwise indicate a correspondence of an address according to one addressing scheme with another address according to a different encoding scheme. Such a data structure may be stored, for example, in a predefined region of memory 116 which is dedicated to memory management.

Memory map state may specify or otherwise indicate an offset address value which is to be applied in the conversion of any address in a particular set of addresses. Alternatively or in addition, memory map state may associate a given address with an identifier of a compute node which includes the memory location targeted by that address. In the example embodiment shown, MML 118 may signal the configuration of an address space for selectively addressing memory locations of the shared memory. For example, MML 118 may include or otherwise have access to a range of addresses 140, at least some of which is available to be used by FPGA 114 to access at least some of memory 116. MML 118 may define an address space 142 within the range of addresses 140—e.g., wherein the range of addresses 140 is a larger address space which includes address space 142.

To enable a sharing of memory resources across fabric 120 and between different compute nodes, some addresses of address space 142 may be allocated each to represent a respective memory location other than any memory location of compute node 110. By way of illustration and not limitation, address space 142 may include sets of addresses S1 152, ..., Sn 154 which each correspond to a different respective compute node. For a given one of the sets of addresses S1 152, ..., Sn 154, each address of that set of addresses may be registered for targeting a respective memory location of the corresponding compute node. In the example scenario shown, S1 152 may correspond to compute node 110 itself, wherein addresses of S1 152 are each mapped to target a respective memory location (e.g., of memory 116) which compute node 110 has registered as part of the shared memory. By contrast, Sn 154 may instead correspond to compute node 130—e.g., wherein addresses of Sn 154 are each to target a respective memory location (e.g., of memory 136) which has been registered as part of the shared memory. In some embodiments, fabric 120 may further couple compute node 110 to another node (not shown) of system 100—other than any compute node—which omits any compute logic of a FPGA or processor. Some or all memory locations of such a "memory node" may be mapped by FPGA 114 each to a respective addresses of address space 142. The particular number, sizes and order of the sets of addresses S1 152, ..., Sn 154 in address space 142 is merely illustrative, and not limiting on some embodiments. Due to the configuration of address space 142, a memory access request from FPGA 114 may be selectively directed by MML 118 toward a particular one of memory 116 and memory 136—e.g., based on the memory access request targeting an address which is in a corresponding one of S1 152 and Sn 154.

In some embodiments, address space 142 is only a subset of the entire range of addresses 140. For example, the range of addresses 140 may include both address space 142 and at least one other set of addresses S0 140 which are to target respective memory locations of memory 116 other than any memory locations of the shared memory. Accordingly, locations in memory 116 which correspond to addresses in S0 140 may be inaccessible to compute node 130, or may have a more limited accessibility than that which is provided by the shared memory. Some functionality of MML 118 to register memory regions to the shared memory, to define address conversion information and/or to otherwise configure the shared memory may be adapted from conventional memory mapping and address allocation techniques.

To further facilitate configuration of a shared memory, MML 118 may additionally or alternatively operate to expose to another compute node (e.g., to compute node 130) one or more memory regions of memory 116 as being available for registration in the shared memory. For example, circuitry 134 may comprise a counterpart MML coupled to receive, via fabric 120 and FI 132, a message from MML 118 indicating that a memory region of memory 116 is available for access by circuitry 134—e.g., where the memory region associated with an address in S1 152. In response to such a message from MML 118, memory mapping operations may be performed with circuitry 134 and memory 136 to reflect memory mapping and address space configurations which (for example) are the same as, or a corollary to, that for address space 142.

Additionally or alternatively, MML 118 may provide signaling to access a memory location which has already been registered as belonging to the shared memory. For example, at some point during operation of system 100, MML 118 may receive from other circuitry of FPGA 114 a request to read from, write to or otherwise access a memory location. Such a request may be generated in preparation for, or as part of, the performance of a task which has been assigned to FPGA 114 by hardware and/or software logic which is external to FPGA 114 (and, in some embodiments, external to compute node 110). In such an embodiment, circuitry of MML 118 may selectively provide processing of the request based on whether (or not) it targets a memory location which is local to computer node 110—e.g., as opposed to targeting a memory location at compute node 130 or some other compute node of device 100. For example, MML 118 may include, have access to, be programmed with or otherwise operate based on a current memory map state which variously corresponds addresses of address space 142 each to a respective compute node (and in some embodiments, each to a respective memory location of that compute node). Such a memory map state may be a basis for determining address offset values and/or other mechanisms by which an address according to one addressing scheme may be converted into another address according to a different addressing scheme. Accordingly, MML 118 may identify, based on the current memory map state and a target address of the request, a particular one of memories 116, 136 as including the targeted memory location.

Where a location of memory 116 is determined to the target, FPGA 114 may provide the request for servicing by memory 116. By contrast, the request may alternatively be sent from FPGA 114 to FI 112 where it is determined that a shared memory location of memory 136 is targeted. Processing of such a request by FI 112 may include formatting the request for communication via fabric 120 and receipt by computer node 130. However, FI 112 may further comprise circuitry to maintain at least part of a cache for data stored by the shared memory. In such an embodiment, a cache agent (not shown) of FI 112 may perform a search to see whether a cache at compute node 110 includes a cached version of data stored at the memory location targeted by the request.

Although some embodiments are not limited in this regard, MML 118 (or alternatively, circuitry of FI 112) may further operate to detect for, and respond to, an inability to access a part of the shared memory which is external to compute node 110. For example, one of MML 118 and FI 112 may signal, poll, snoop and/or otherwise operate to detect whether, according to some predetermined criteria, another compute node (e.g., compute node 120) is inaccessible or has otherwise failed to meet some threshold performance level. In response to detecting such failure, one of MML 118 and FI 112 may issue a software interrupt to an executing processor which is part of, or coupled to, device 100.

FIG. 2 shows features of a method 200 to provide access to a shared memory according to an embodiment. Method 200 is one example of an embodiment wherein processes, performed at a first compute node, facilitate access to a shared memory which spans a fabric interconnecting multiple compute nodes. Some or all of method 200 may be performed with compute node 110, for example.

As shown in FIG. 2, method 200 may include (at 210) configuring a shared memory, with a FPGA of a first compute node, to include a memory region of a second compute node which is coupled, via a fabric, to a fabric interface of the first compute node. Configuring the shared memory at 210 may include the FPGA defining with a memory map a correspondence of the memory region of the second compute node with a set of addresses of an address space. The configuring at 210 may be based the first compute node receiving a message (e.g., from the second compute node) which indicates an availability of the memory region of the second compute node to be registered as part of the shared memory.

The first compute node and the second compute node may comprise, respectively, a first memory region and a second memory region—e.g., wherein method 200 further comprises configuring the shared memory to further include the first memory region, and sending to the second compute node a message indicating that the shared memory region is to include the first memory region. In such an embodiment, the first compute node may further comprise a third memory region other than any memory region of the shared memory. For example, accessibility of such a third memory region (if any) by the second node may more limited than the accessibility of the first memory region by the second node. Although some embodiments are not limited in this regard, the first compute node may additionally or alternatively comprise one or more processor cores coupled to operate with the FPGA—e.g., wherein the one or more processor cores are to participate in processing of a workload which includes tasks variously assigned to different compute nodes.

Method 200 may further comprise (at 220) sending from the FPGA of the first compute node a request to access the shared memory, wherein, based on a memory map, the request is sent to the fabric interface. For example, memory management logic of the FPGA may detect, based on a current memory map state and an address included in the request, that the request targets a memory location of the second compute node (or some other compute node other than the first computer node). In response, the request may be sent for processing by the fabric interface. Such processing may include communication of the request, via the fabric, to the targeted compute node.

Method 200 may additionally or alternatively include (at 230) communicating, from the fabric interface to the FPGA, a response to the request which is sent at 220. The response may include data provided by the compute node which was targeted by the request. For example, the targeted compute node may receive and service the request, providing requested data and/or other information to be included in the response. In some embodiments, method 200 may further comprise maintaining a cache with the fabric interface of the compute node—e.g., wherein the maintaining includes accessing a cache line of the cache based on a message received by the fabric interface from one of the FPGA and the second compute node. Maintaining the cache may include circuitry of the fabric interface implementing a cache coherency protocol with another fabric interface of the second compute node (and/or one or more other compute nodes coupled to the fabric). In such an embodiment, the response communicated to the FPGA at 230 may include a cached version of data which is stored at the targeted compute node. For example, the cached version of such data may be retrieved by a cache agent of the fabric interface in response to the request sent at 230. In such a scenario, successful retrieval of a cached version of the data may preclude the need for the request to be sent from the fabric interface to the targeted compute node.

Method 200 may further comprise (at 240), performing a task assigned to the FPGA, including processing data of the response to the request with the FPGA. The task may be a first task of multiple tasks which are performed in parallel—e.g., wherein the second compute node is assigned a second task of the multiple tasks. In an embodiment, the data is both received and processed at the FPGA independent of any storage of the data, based on the request, to any memory location of the first compute node which is represented in the address space. For example, communication of the response at 230 may include communicating to the FPGA data of the response which has yet to be stored to any memory location of memory 116 which is registered to the shared memory. After receiving such data, the FPGA may perform one or more operations to evaluate, modify or otherwise process the data in the furtherance of an assigned task. Such one or more operations may take place prior to and/or otherwise independent of any storing of the data to any memory location of memory 116 which is registered to the shared memory, where any such storing is based on the request sent at 220. In this way, some embodiments variously provide a type of direct memory access (DMA) functionality whereby a FPGA of a given compute node may begin working on at least some types of data without the need to store the data at any time which is after receipt of the data from a fabric interface, but before the work on the data by the FPGA.

Figure 3:
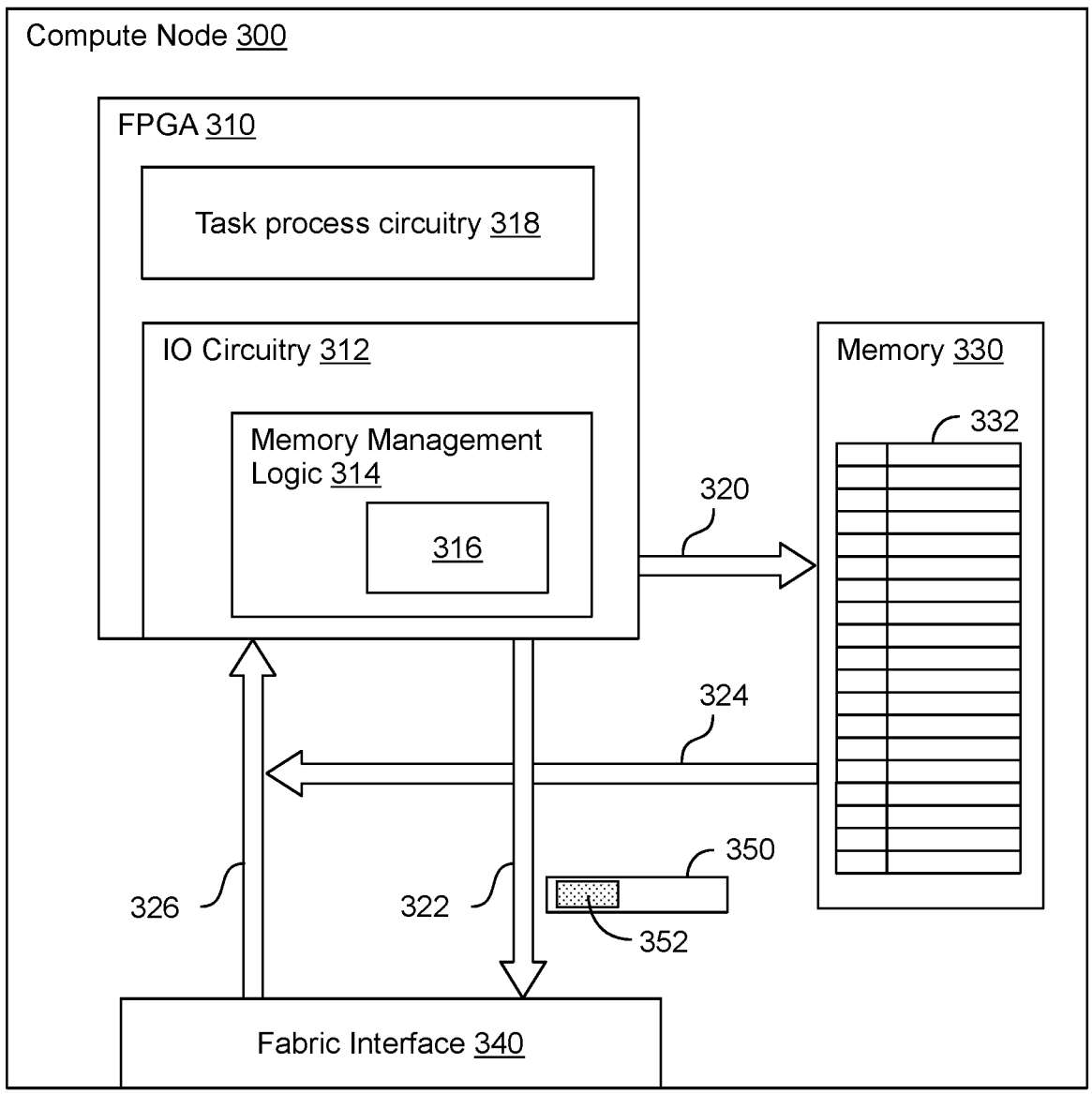
FIG. 3 is a functional block diagram illustrating elements of a compute node to provide a FPGA with access to a shared memory according to an embodiment.

FIG. 3 shows features of a compute node 300 to facilitate operation of a shared memory according to an embodiment. Compute node 300 illustrates an embodiment wherein a FPGA of a first compute node is operable to configure and/or access a shared memory which includes memory resources of a second compute node. Compute node 300 may include some or all of the features of compute node 110, for example.

As shown in FIG. 3, compute node 300 may include a FPGA 310 comprising circuitry (such as the illustrative task process circuitry 318 shown) which is configured to perform one or more processes of some task which is to be assigned to compute FPGA 310. The assigning of such a task to task process circuitry 318 may include operations adapted from conventional techniques for allocating work among compute nodes which are coupled to one another via a fabric. The task—e.g., one of multiple tasks to be performed in parallel each by a different respective compute node—may be based on, or may result in, one or more requests from task process circuitry 318 to access the shared memory. Some embodiments are not limited to a particular type of task to be performed with task process circuitry 318, to a particular agent which assigns such a task, and/or to a particular mechanism used by such an agent assigns the task to FPGA 310.

Compute node 300 may further comprise a memory 330 coupled to FPGA 310—e.g., wherein an array 332 of addressable memory locations includes at least some memory locations which are accessible by task process circuitry 318. By way of illustration and not limitation, FPGA 310 may further comprise circuitry—such as the illustrative input and/or output (10) circuitry 312 shown—which communicates messages on behalf of task process circuitry 318 and/or other circuitry of FPGA 310. Such messages may include control messages to create, update and/or otherwise configure a shared memory. In one example embodiment, the shared memory is to include memory locations of another compute node (not shown) coupled to compute node 300 via a fabric interface 340 thereof. The shared memory may further include some memory locations of memory array 332.

IO circuitry 312 may support communication timing and/or format requirements of fabric interface 340 and/or memory 330. Such requirements may be adapted from or otherwise compatible with any of a variety of interconnect standards—e.g., wherein fabric interface provides communication functionality such as that of an Omni-Path Host Fabric Interface (HFI) or any of various other such high performance interconnect architectures. To promote quick access by FPGA 310 to resources of a shared memory, IO circuitry 312 may include or couple to memory management logic (MML) 314 of FPGA 310—e.g., wherein memory management logic 314 includes some or all of the features of MML 118. For example, MML 314 may operate to determine whether a memory access request from task process circuitry 318 targets a memory location at array 332 (or, alternatively, targets a shared memory location which is at a different compute node). Such determining may be based on a current memory mapping state 316 which is determined at or otherwise accessible to MML 314. The current memory mapping state 316 may include a configuration of MML 314 which is based on memory map information that defines one or more address spaces. For example, memory map information may be used by MML 314 (and/or by circuitry of fabric interface 340) to access and distinguish between address spaces which each correspond to a different respective set of memory resources.

A given address space may correspond to a particular type of memory locations—e.g., wherein an address space is specific to memory locations of memory array 332 or, alternatively, to memory locations of a memory (not shown) that may be included in FPGA 310. Alternatively or in addition, a given address space may correspond to registration (or non-registration) of the associated memory locations in a shared memory. Accordingly, address space information may be used by MML 314 to selectively choose any of multiple different operations to process a memory access request from task process circuitry 318, where such choosing is based on whether (or not) the memory access request targets an address in a particular address space.

By way of illustration and not limitation, FPGA 310 may be coupled to memory 330 via signal paths 320, 324, and further coupled to fabric interface 340 via signal paths 322, 326. In response to task process circuitry 318 generating a given memory access request, MML 314 may choose between sending the request (or an address-converted version thereof) via signal path 320 or signal path 322. In one example embodiment, MML 316 may determine, based on the current memory mapping state 316, that an address targeted by a memory access request (such as the illustrative memory access request 350 shown) is mapped to a memory location of another compute node. In response, MML 314 may include an identifier send the memory access request 350 to fabric interface 340 via signal path 322. Although some embodiments are not limited in this regard, MML 314 may further provide an identifier of the other compute node—e.g., wherein the identifier added to as memory access request 350 metadata 352 such as a tag, an encapsulating header, or the like.

In an embodiment, fabric interface 340 may provide a response to memory access request 350—e.g., wherein the response is sent to IO circuitry 312 via signal path 326. The response may include data which is provided by another compute node or, alternatively, by a cache agent (not shown) of fabric interface 340. Due to complementary memory sharing being implemented with FPGAs of different respective compute nodes, data of such a response may be passed through IO circuitry 312 for use in operations by task process circuitry 318—e.g., independent of any need to store the data from the response to any location of memory array 332 (or at least not to any portion of memory array 332 which is registered as part of the shared memory).

Figure 4:
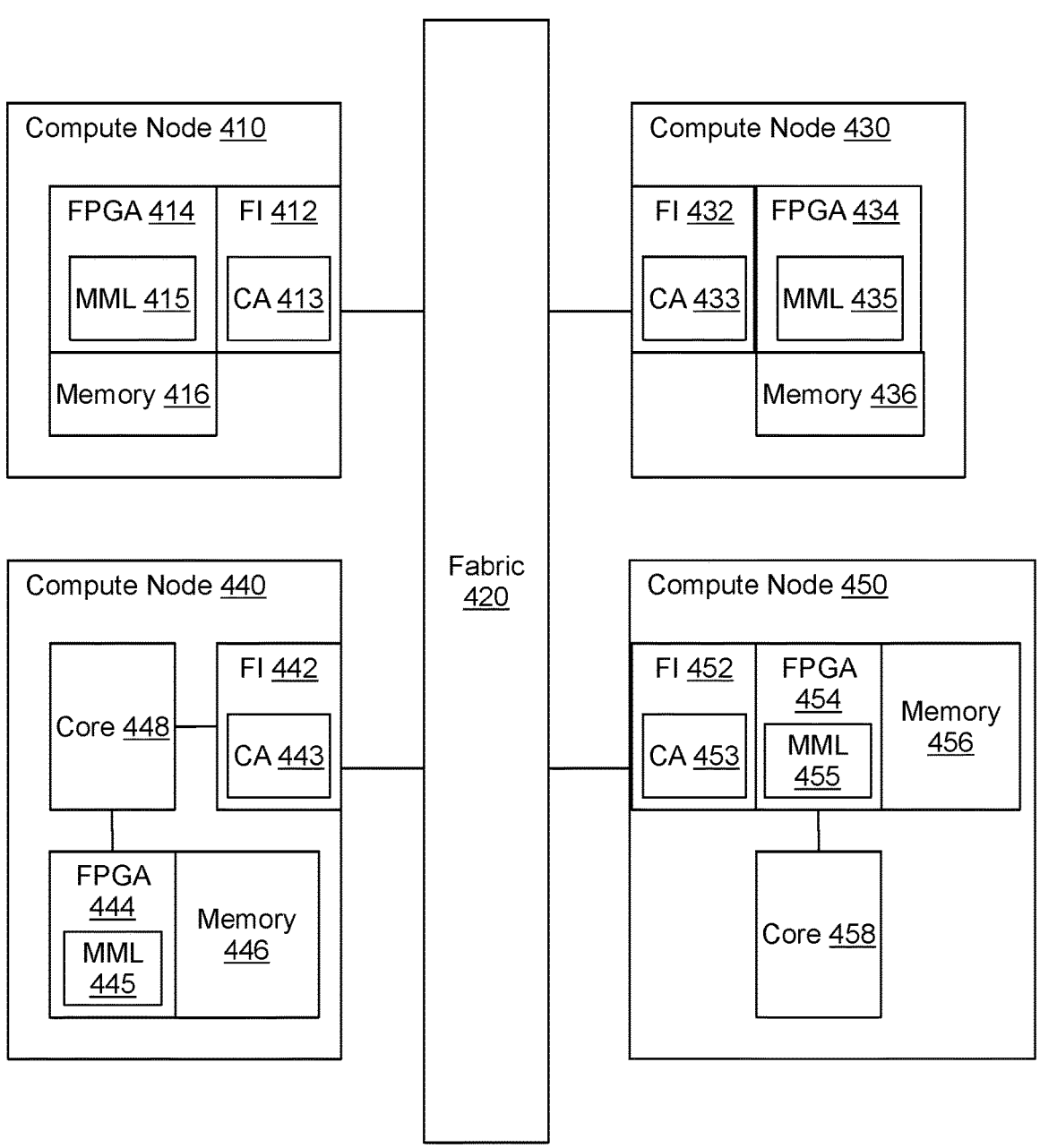
FIG. 4 is a functional block diagram illustrating elements of a system to provide sharing of memory resources according to an embodiment.

FIG. 4 shows features of a device 400 to facilitate a sharing of memory resources by FPGAs of different respective compute nodes according to an embodiment. Device 400 shows one example of an embodiment wherein a fabric is variously coupled to multiple compute nodes having various respective architectures. Some or all such compute nodes may each include a respective FPGA which is capable of retrieving data from a remote memory. Such an FPGA may be able to perform task-related processing of the retrieved data prior to (and/or otherwise independent of) any need to store such retrieved data to a local memory location such as a location which is allocated to the shared memory. Device 400 may include some or all of the features of device 100 and/or may be configured to perform method 200, for example.

As shown in FIG. 4, device 400 may include a fabric 420 and compute nodes 410, 430, 440, 450 which are variously coupled to one another via fabric 420. Some or all of compute nodes 410, 430, 440, 450 may comprise respective memory regions which are registered as part of a shared memory that spans fabric 420.

In the example embodiment shown, compute nodes 410, 430, 440, 450 include respective fabric interfaces 412, 432, 442, 452 each coupled at fabric 420. Computation logic of compute nodes 410, 430, 440, 450 may include respective FPGA 414, 434, 444, 454—e.g., where one or more compute nodes may further comprise respective processor circuits. For example, a processor core 448 of compute node 440 may be coupled to FPGA 444 via an UltraPath Interconnect (UPI) or any of a variety of other conventional interconnect structures. Alternatively or in addition, a processor core 458 of compute node 450 may be similarly coupled to FPGA 444. In the example embodiment shown, FPGA 444 is coupled to FI 442 via processor core 448—e.g., wherein processor core 458 is instead coupled to FI 452 via FPGA 454. However, device 400 more, fewer, and/or differently configured compute nodes, in other embodiments.

To provide a shared memory which spans fabric 420, FPGAs 414, 434, 444, 454 may include respective memory management logic (MML) 415, 435, 445, 455 which—for example—each provide respective functionality such as that of MML 118. The MMLs 415, 435, 445, 455 may communicate with one another via fabric 420 to expose memory locations for registration to be part of the shared memory. Furthermore, the MMLs 415, 435, 445, 455 may variously facilitate the servicing of memory access requests where by data may be quickly provided to various ones of FPGAs 414, 434, 444, 454. In some embodiments, the shared memory is supported with data caching functionality which, for example, is implemented at least in part with respective cache agents CAs 413, 433, 443, 453 of FIs 412, 432, 442, 452. For example, CAs 413, 433, 443, 453 may be variously configured each to maintain cached versions of data in the shared memory that has been recently accessed by a corresponding one of FPGAs 414, 434, 444, 454. In such an embodiment, servicing of a memory access request by a given FPGA may result in communications between various ones of CAs 413, 433, 443, 453—e.g., where such communications are according to a cache coherency protocol.

Figure 5:
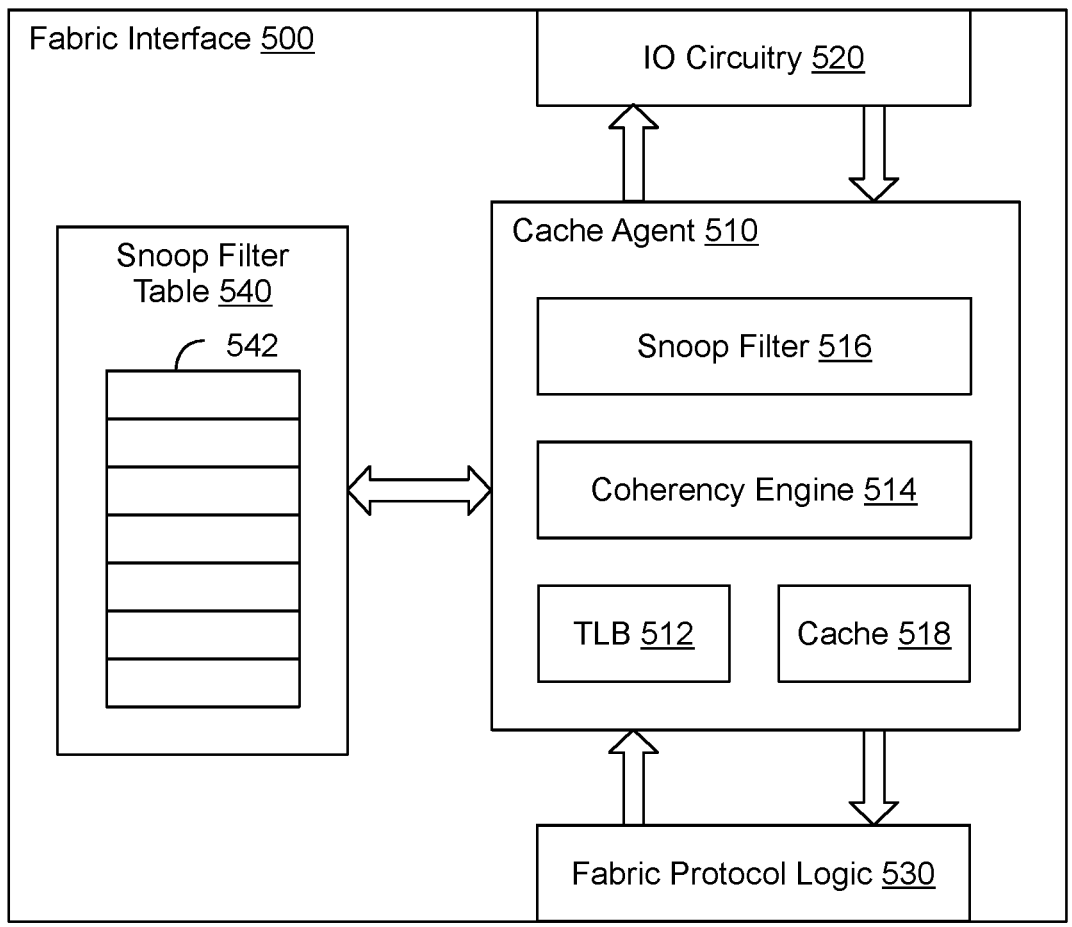
FIG. 5 is a functional block diagram illustrating elements of a fabric interface of a compute node according to an embodiment.

For example, FIG. 5 shows features of a fabric interface 500 to facilitate access to shared memory by a FPGA of a compute node according to an embodiment. Fabric interface 500 is one example of an embodiment that is operable to maintain a cache based on communications between a FPGA of a first compute node and another compute node. Fabric interface 500 may include some or all of the features of one of fabric interfaces 112, 340, 412, 432, 442, 452, for example.

As shown in FIG. 5, fabric interface 500 may include IO circuitry 520 to couple to one or more buses and/or other interconnects (e.g., comprising signal paths 322, 326) by which a FPGA of the compute node is to couple to fabric interconnect 500. In such an embodiment, fabric interface 500 may further comprise fabric protocol logic 530 which is to be coupled for communication with an interconnect fabric such as fabric 120. Fabric protocol logic 530 may support a conversion, reformatting, timing and/or other processing of communications which are variously transmitted to, or received from, such a fabric. For example, fabric protocol logic 530 may prepare messages—on behalf of a FPGA which is coupled to fabric interface 500 via 10 circuitry 520—for communication in the fabric which is compatible with a PCIe standard. Such messages may include register messages which identify (or "expose") memory locations which are to be registered as part of a shared memory. Alternatively or in addition, such messages may include requests to access memory locations of such a shared memory.

To further expedite access to data of the shared memory, fabric interface 500 may include a cache agent 510 which is to store cached versions of data recently accessed by the FPGA. Circuitry of cache agent 510 may provide functionality—e.g., such as that of a cache 518, a coherency engine 514, a snoop filter 516 and/or a translation lookaside buffer 512—which, for example, is adapted from conventional data caching architectures. Cache agent 510 may maintain an updated local cache 518 of recently accessed data—e.g., wherein at least some caching by the cache 518 is in response to the local compute node accessing data which is stored at a remote compute node. In an embodiment, coherency engine 514 may participate in communications with counterpart coherency engines in one or more other fabric interfaces—e.g., wherein such communications are according to a cache coherency protocol. Such a coherency protocol may be any of various existing coherency protocols (such as MESI, MEOSI etc.). Alternatively or in addition, snoop filter 516 may operate to maintain, at a snoop filter table 540, entries 542 each representing a respective cache line. Snooping by cache agent 510 may further facilitate coherency between respective caches of different fabric interfaces. Accordingly, cache agent 510 may help maintain coherency for an address space that is shared across multiple FPGAs of different respective compute nodes. In other embodiments, cache agent 510 may participate in a distributed directory scheme to provide coherence and/or to reduce snoops—e.g., wherein distributed directory bits are used to facilitate tracking usage of a shared memory region by multiple FPGAs on different respective compute nodes.

FIGS. 6 through 9 show respective signal exchanges 600, 700, 800, 900 to variously illustrate communications, each according to a corresponding embodiment, which facilitate a sharing of memory resources between multiple compute nodes. In some embodiments, communication between compute nodes via a fabric—e.g., including communications of some or all of signal exchanges 600, 700, 800, 900—may be tunneled in a network protocol. For example, messages communicated via a fabric—the messages to configure a shared memory or to access information stored by the shared memory—may be tunneled in a L4 (Transport) layer of a network stack. Such tunneling may reduce or eliminate the need to change an existing fabric stack architecture to implement some embodiments. For example, traffic flows according to a conventional network protocol may be extended to implement messaging required by a cache coherency protocol that is used to maintain a cache for a shared memory. Such a cache coherency protocol may be compatible an existing coherency protocol such as a MESI protocol or a MEOSI protocol.

Figure 6:
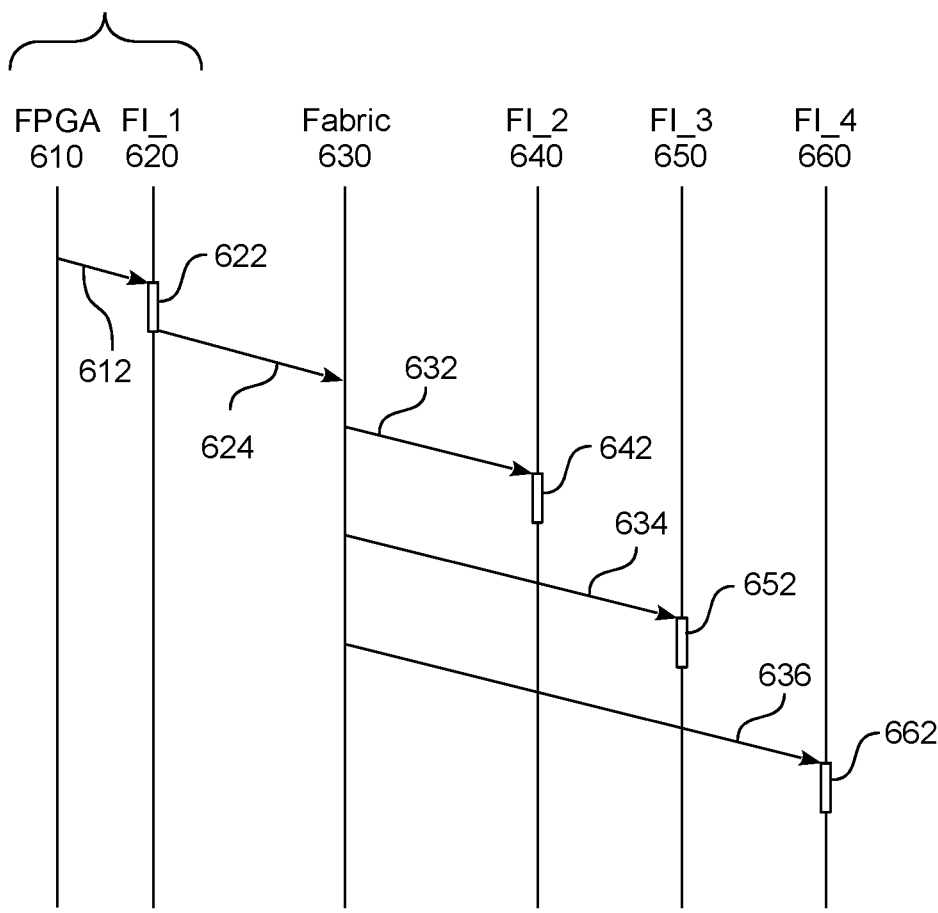
FIG. 6 is a swim-lane diagram illustrating elements of a signal exchange to configure a shared memory according to an embodiment.

FIG. 6 shows features of a signal exchange 600 to register a memory region as part of a shared memory according to an embodiment. Signal exchange 600 may be performed with one of devices 100, 400—e.g., wherein compute node 300 and/or fabric interface 500 participate in signal exchange 600. Participants in signal exchange 600 may include a FPGA 610 and a fabric interface FI_1 620 (each of a first compute node), as well as a fabric interface FI_2 640 of a second compute node, a fabric interface FI_3 650 of a third compute node, and a fabric interface FI_4 660 of a fourth compute node. Such compute nodes may be variously coupled together via a fabric 630 which also facilitates communications of signal exchange 600.

Network traffic flows may be variously used by the respective FPGAs of different compute nodes—e.g., where each FPGA is to expose to (share with) one or more respective peer FPGAs a range of memory which that FPGA is to provide as part of a globally shared address space. For example, as shown in FIG. 6, signal exchange 600 may include FPGA 610 sending to FI_1 620 a registration message 612 which indicates that some memory locations of the first compute node have been, or are to be, registered as part of the shared memory. In an embodiment, registration message 612 may indicate a start address and a size of the memory locations. In response to registration message 612, FI_1 620 may perform operations 622 which, for example, are to configure a cache which is to be maintained with FI_1 620. Operations 622 may include creating and/or otherwise initializing a snoop filter table, a translation look aside buffer and/or any of various other data structures of a data caching system.

After operations 622 have begun configuring a cache at the first compute node, FI_1 620 may communicate to fabric 630 a message 624 for exposing to one or more other compute nodes the memory locations which the first node is registering in the shared memory. Message 624 may be multicast or otherwise relayed by fabric 630—e.g., as signaling 632 to FI_2 640, as signaling 634 to FI_3 650, and as signaling 636 to FI_4 660. In response to signaling 632, FI_2 640 may perform operations 642 to signal that address converter functionality—e.g., provided by memory management logic of the second node—is to variously correspond addresses of an address space to the memory locations which are being registered as part of the shared memory. Similarly, operations 652 by FI_3 650 in response to signaling 634 may provide a memory map configuration state at the third node to corresponds addresses of an address space to the memory locations being registered. Alternatively or in addition, operations 662 by FI_4 660 in response to signaling 636 may similarly provide a memory map configuration to reflect registration of the memory locations in the memory space.

Figure 7:
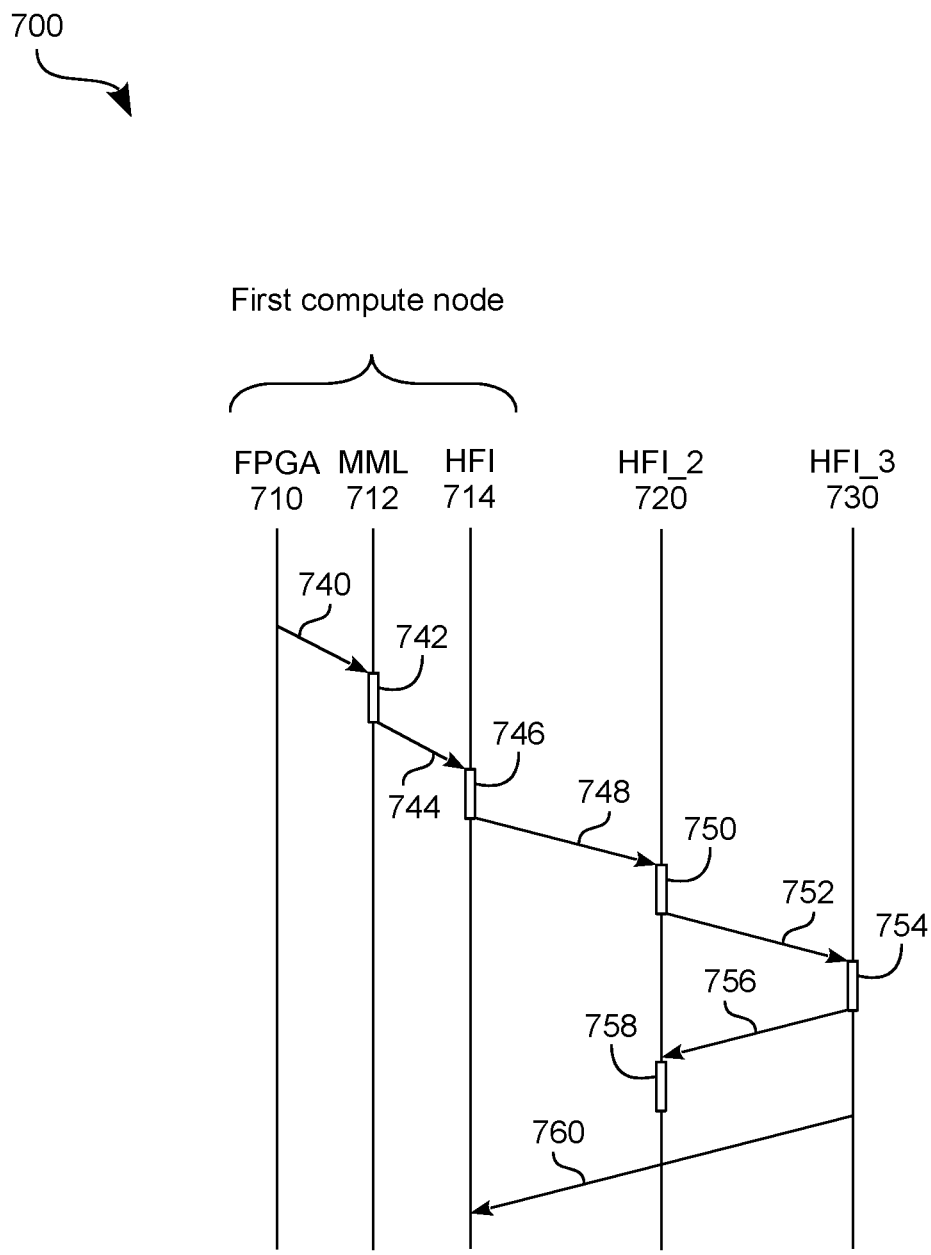
FIGS. 7 through 9 are swim-lane diagrams each illustrating a respective signal exchange to provide a cache coherency between compute nodes according to a corresponding embodiment.
Figure 8:
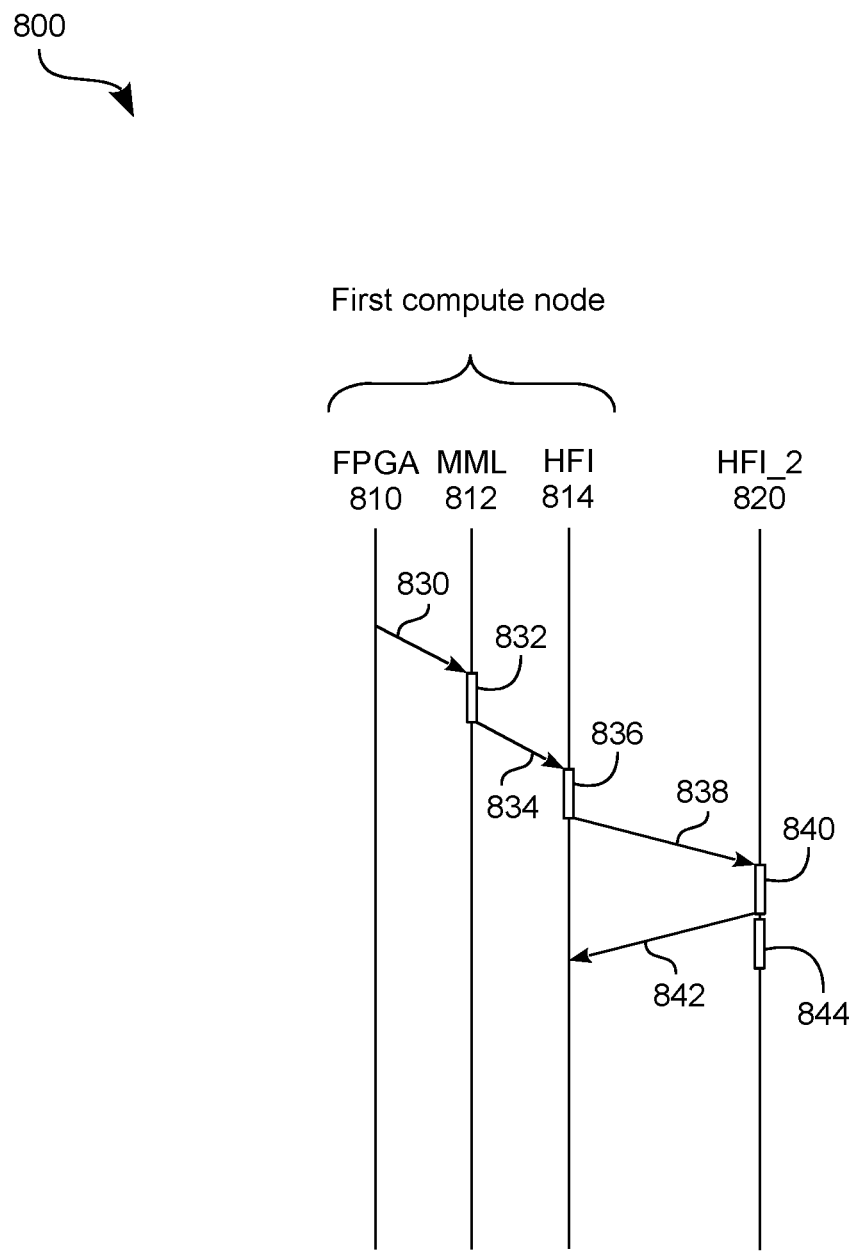

FIGS. 7 and 8 show respective signal exchanges 700, 800 each to maintain a cache of a shared memory using a cache coherency protocol according to a corresponding embodiment. One or both of signal exchanges 700, 800 may be performed with one of devices 100, 400—e.g., wherein compute node 300 and/or fabric interface 500 participate in signal exchange 600. Participants in signal exchange 700 may include a FPGA 710, memory management logic MML 712 and a fabric interface HFI 714 (each of a first compute node), as well as a fabric interface HFI_2 720 of a second compute node, and a fabric interface HFI_3 730 of a third compute node. The compute nodes may be interconnected via a fabric (not shown) which also facilitates communications of signal exchange 700.

As shown in FIG. 7, signal exchange 700 may include FPGA 710 issuing a read for ownership (RFO) message 740 which is to function as a combination of a read request and an invalidate broadcast. For example, RFO message 740 may attempt to try to write to one targeted cache line that is in a shared (S) or invalid (I) state of a MESI protocol, and may cause one or more other caches each to set the state of any other such targeted cache line to invalid. Operations 742 by MML 712, in response to RFO message 740, may determine a processing to be applied to RFO message 740. For example, in response to identifying a control message type of RFO message 740, MML 712 may merely forward to HFI 714 the RFO message 740 (or an address converted or otherwise reformatted version thereof) as represented by the signaling 744 shown. In response to signaling 744, HFI 714 may perform operations 746 which, for example, are to search a snoop filter table for an entry which corresponds to a target of the RFO message 740.

In the example scenario shown, the snoop filter table search of operations 746 results in a miss, which in turn may result in the RFO message being communicated—as signaling 748—from HFI 714 to HFI_2 720 via a fabric which is coupled therebetween. In response to signaling 748, HFI_2 720 may perform operations 750 to search a snoop filter table of the second compute node—e.g., wherein the search is similar to that performed at operations 746. In the example scenario shown, the snoop filter table search of operations 750 results in a hit, as well as a subsequent write which modifies the relevant cache line at the second compute node. Based on the cache line modification performed by operations 750, a snoop message 752 may then be sent to detect for, and invalidate, any other cache lines which correspond to the target of RFO message 740.

In the example scenario shown, operations 754 at HFI_3 730 (in response to snoop message 752) result in a hit, and subsequent invalidation of, a cache line at the third compute node. As required according to the MESI coherency protocol being used, HFI_3 730 may send an acknowledgement (ACK) message 756 which, in turn, results in operations by HFI_2 720 to update the modified cache line at the second compute node to an exclusive (E) state. Furthermore, HFI_3 730 may send to HFI 714 a message 760—as a response to signaling 748—which includes data from the invalidated cache line at the third compute node.

Referring now to FIG. 8, participants in signal exchange 800 may include a FPGA 810, memory management logic MML 812 and a fabric interface HFI 814 (each of a first compute node), as well as a fabric interface HFI_2 820 of a second compute node. The compute nodes may be interconnected via a fabric (not shown) which also facilitates communications of signal exchange 800.

As shown in FIG. 8, signal exchange 800 may include FPGA 810 generating a memory access request 830 to read data of a memory location which, for example, is indicated with a virtual address. In the example scenario shown, the read request targets a memory location of a compute node other than the first compute node. Processing of memory access request 830 may include operations 832 (performed by MML 812) which, for example, are to determine whether memory access request 830 is to be provided to HFI 814—e.g., as opposed to memory access request 830 being sent to a local memory of the first compute node. In some embodiments, operations 832 further comprise converting an address of memory access request 830—e.g., to translate a virtual address in the memory access request 830 to a corresponding physical address.

Based on operations 832, a converted memory access request 834 may be provided from MML 812 to HFI 814. In some embodiments, the converted memory access request 834 includes, or is communicated along with, an identifier of a compute node (e.g., the second compute node) which includes the memory location targeted by the converted memory access request. In other embodiments, identifying such a compute node may be performed later—e.g., wherein address conversion functionality is provided at HFI 814. Processing of the converted memory access request 834 may include operations 836 performed by cache agent circuitry of HFI 814. For example, operations 836 may include searching a snoop filter table of the first compute node for an entry which corresponds to a target address of the memory access request.

In the example scenario shown, the snoop filter table search of operations 836 results in a miss, whereupon the memory access request may be communicated as signaling 838 via a fabric (not shown) to HFI_2 820. In response to signaling 838, HFI_2 820 may perform operations 840 to search a snoop filter table of the second compute node for an entry which corresponds to a target address of the memory access request. Operations 840 may result in a hit of an entry in the snoop filter table, whereupon the snoop filter entry in question may be placed in a shared state, and the requested data may be sent in a reply 824 back to the first compute node via HFI 814. In such an embodiment, additional operations 844 at HFI_2 820 may provide to the snoop filter table with an update list of sharers of the entry in question.

Figure 9:
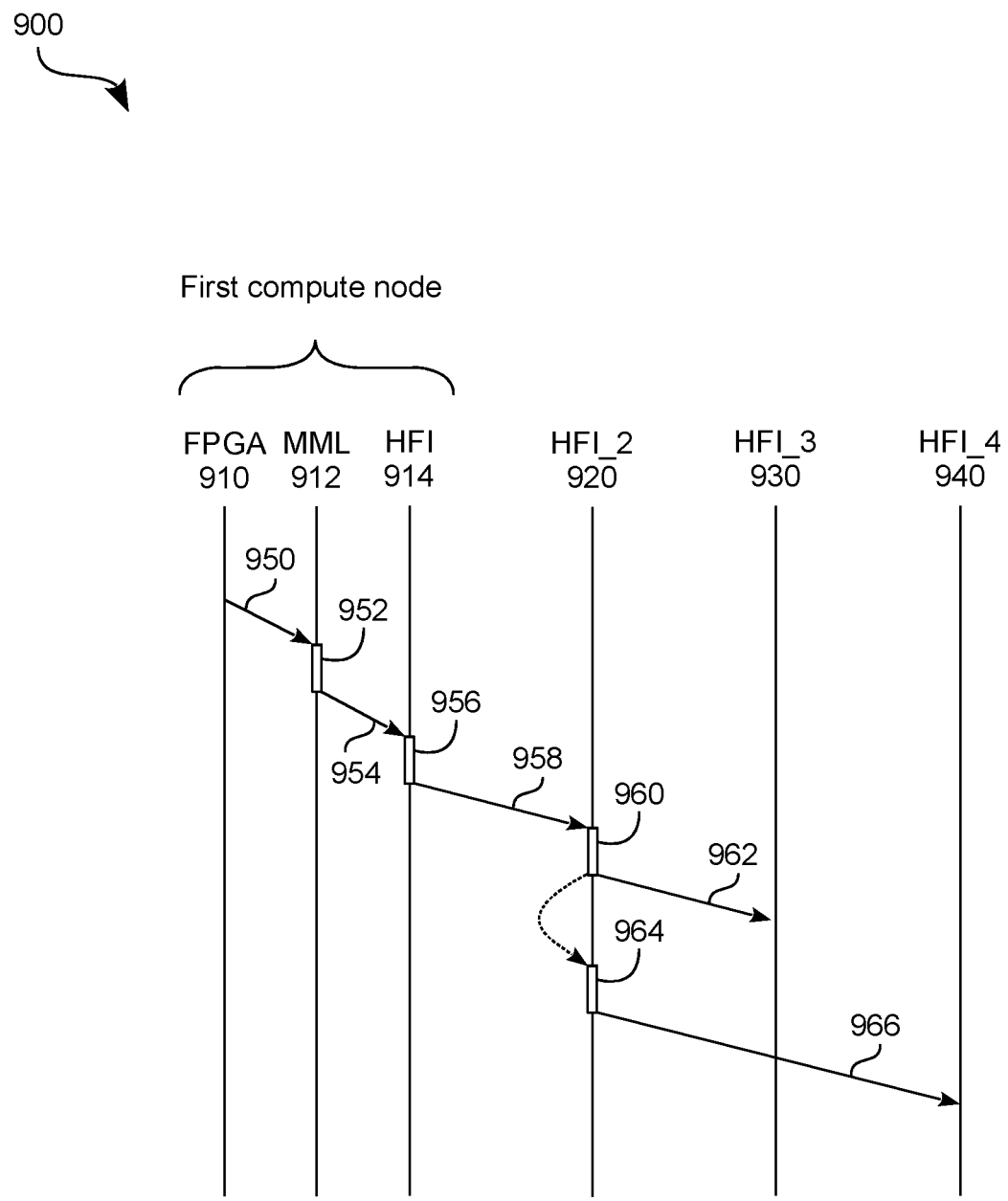

FIG. 9 shows features of a signal exchange 900 to detect and respond to a loss of access to a shared memory resource according to an embodiment. Signal exchange 900 may be performed with one of devices 100, 400—e.g., wherein compute node 300 and/or fabric interface 500 participate in signal exchange 900. Participants in signal exchange 900 may include a FPGA 910, memory management logic MML 912, and a fabric interface FI_1 920 (each of a first compute node), as well as a fabric interface HFI_2 920 of a second compute node, a fabric interface HFI_3 930 of a third compute node, and a fabric interface HFI_4 940 of a fourth compute node. Such compute nodes may be variously coupled together via a fabric (not shown) which also facilitates communications of signal exchange 900.

As shown in FIG. 9, signal exchange 900 may include FPGA 910 generating a memory access request 950 to read data of a target memory location. Processing of memory access request 950 may include operations 952 (performed by MML 912) which, for example, are to determine whether memory access request 950 is to be provided to HFI 914 or a local memory of the first compute node. In some embodiments, operations 952 further comprise converting an address of memory access request 950. Alternatively, such address conversion may be performed at HFI 914. Based on operations 952, a converted memory access request 954 may be provided from MML 912 to HFI 914. Operations 956 based on the converted memory access request 954 may include cache agent circuitry of HFI 914 searching a snoop filter table of the first compute node for an entry which corresponds to a target address of the memory access request. In the example scenario shown, the snoop filter table search of operations 956 return in a miss, resulting in the memory access request being communicated as signaling 958 via the fabric to HFI_2 920. In response to signaling 958, HFI_2 920 may perform operations 960 to search a snoop filter table of the second compute node. Operations 960 may return a hit of an entry in the snoop filter table, which in turn may result in the snoop filter entry in question being placed in a modified state.

Subsequently, HFI_2 920 may send to another fabric interface (e.g., HFI_3 930) a snoop message 962 to detect for any other cache lines which correspond to the snoop filter entry in question. A failure of HFI_3 930 to respond to snoop message 962—e.g., within some predefined maximum threshold time period—may result in HFI_2 920 detecting (at operations 964) an unavailability of the third compute node. In response to this unavailability, HFI_2 920 may provide signaling to initiate remedial actions—e.g., wherein such signaling includes a software interrupt 966 which is provided, for example, to HFI_4 940 of the fourth compute node. In such an embodiment, software executing with a processor of the fourth node may cease one or more tasks being performed with the compute nodes, and may initiate diagnostics to evaluate the performance failure by the third compute node.

Figure 10:
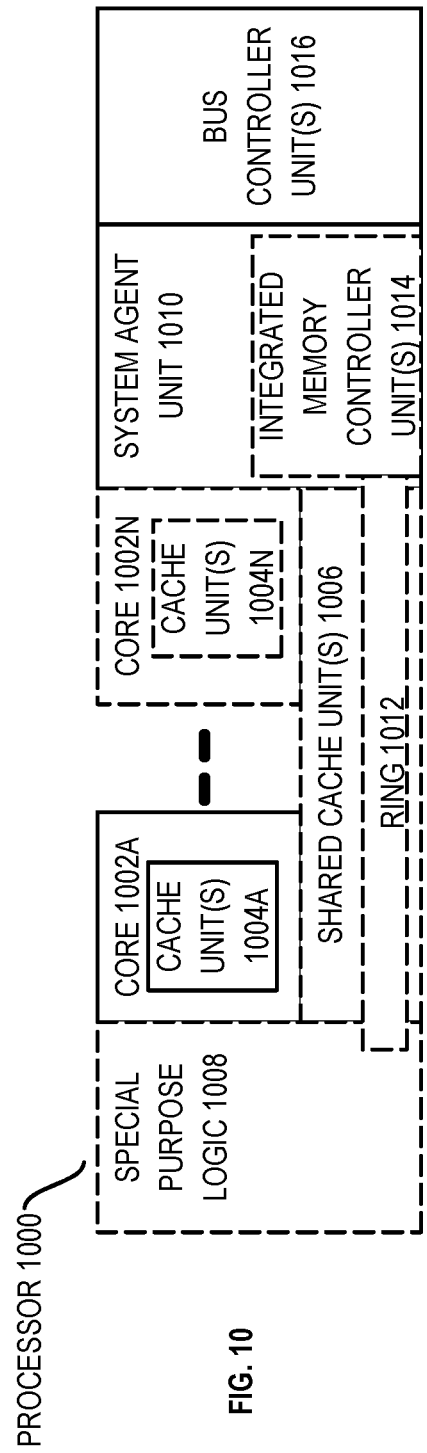
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Figure 11:
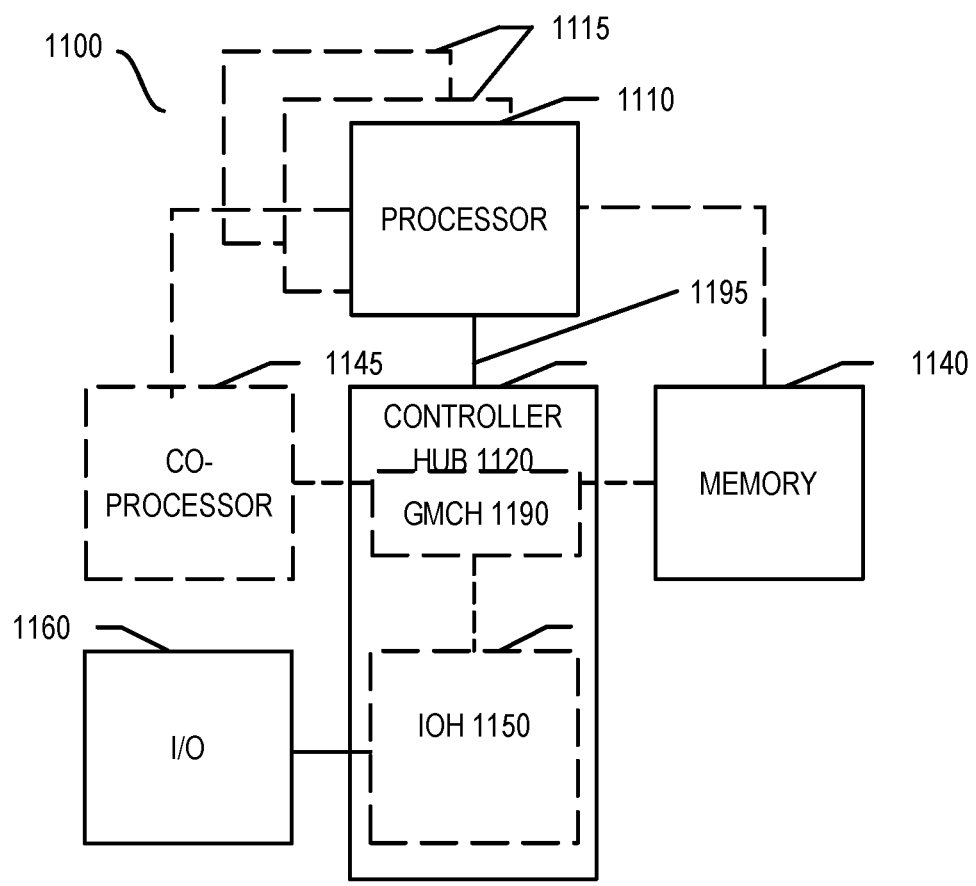
FIGS. 11-14 are block diagrams of exemplary computer architectures.

FIG. 11-QAK are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
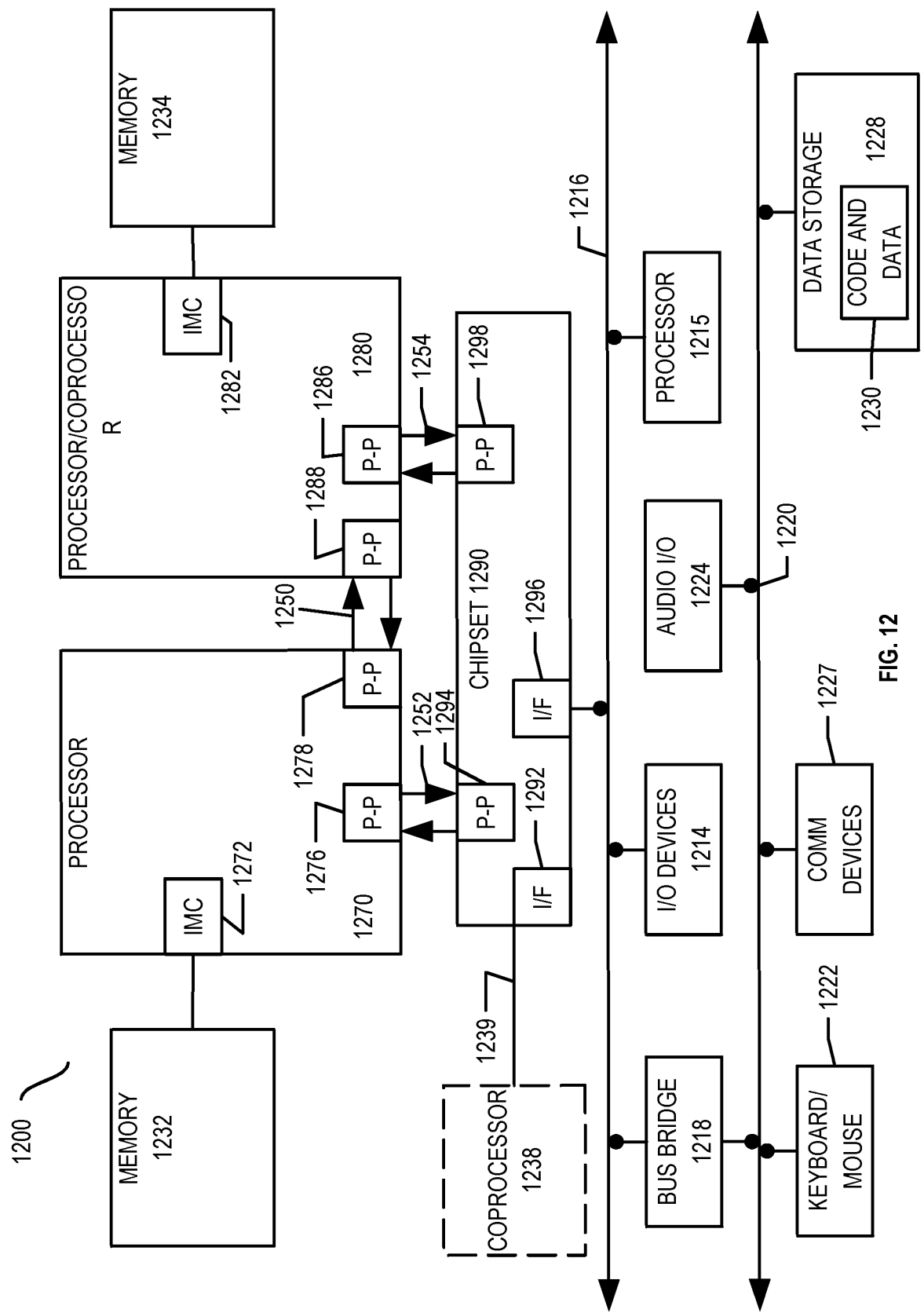

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field-programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
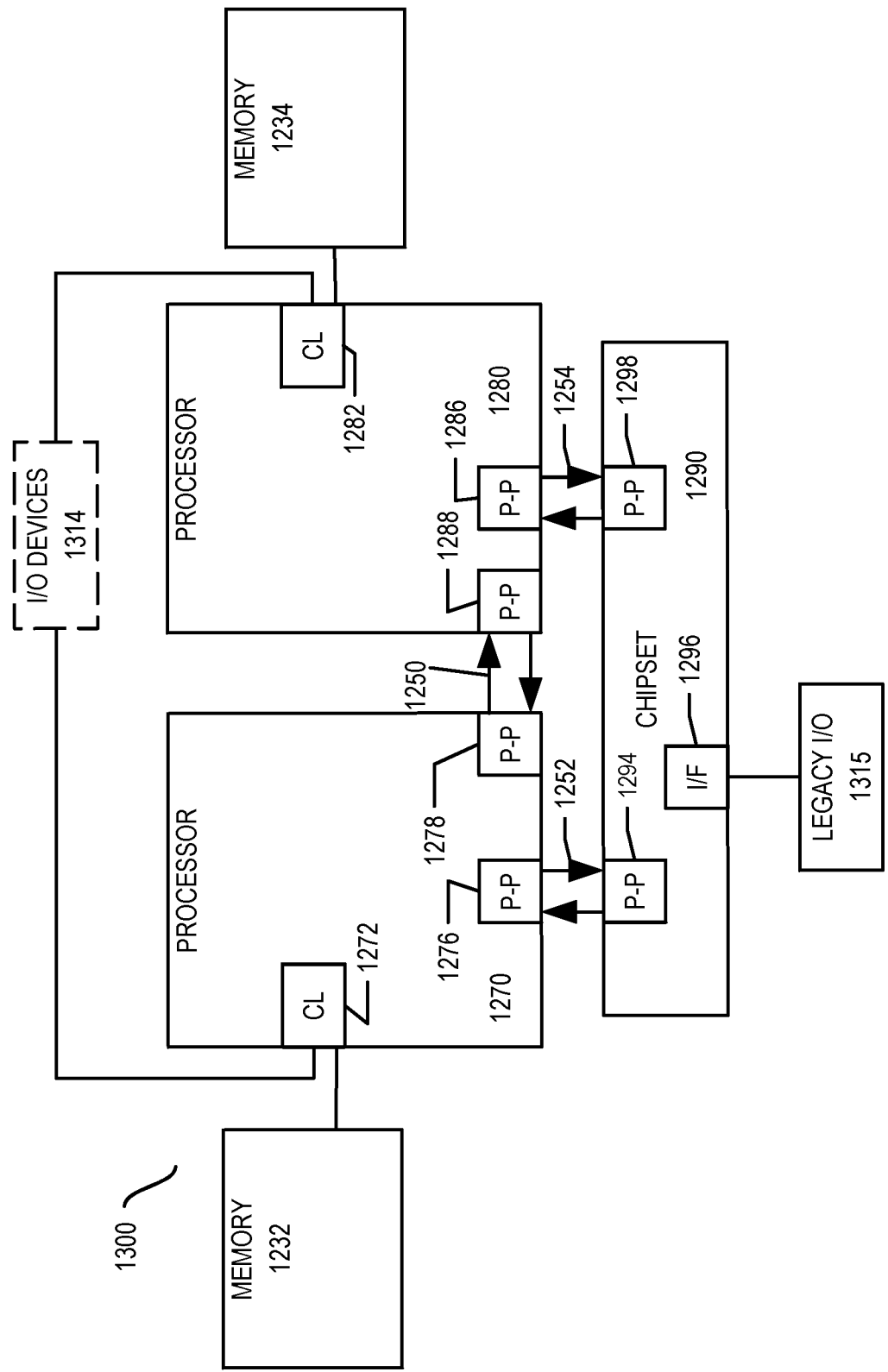

Referring now to FIG. 13, shown is a block diagram of a second more specific exemplary system 1300 in accordance with an embodiment of the present invention. Like elements in FIGS. 12 and 13 bears like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
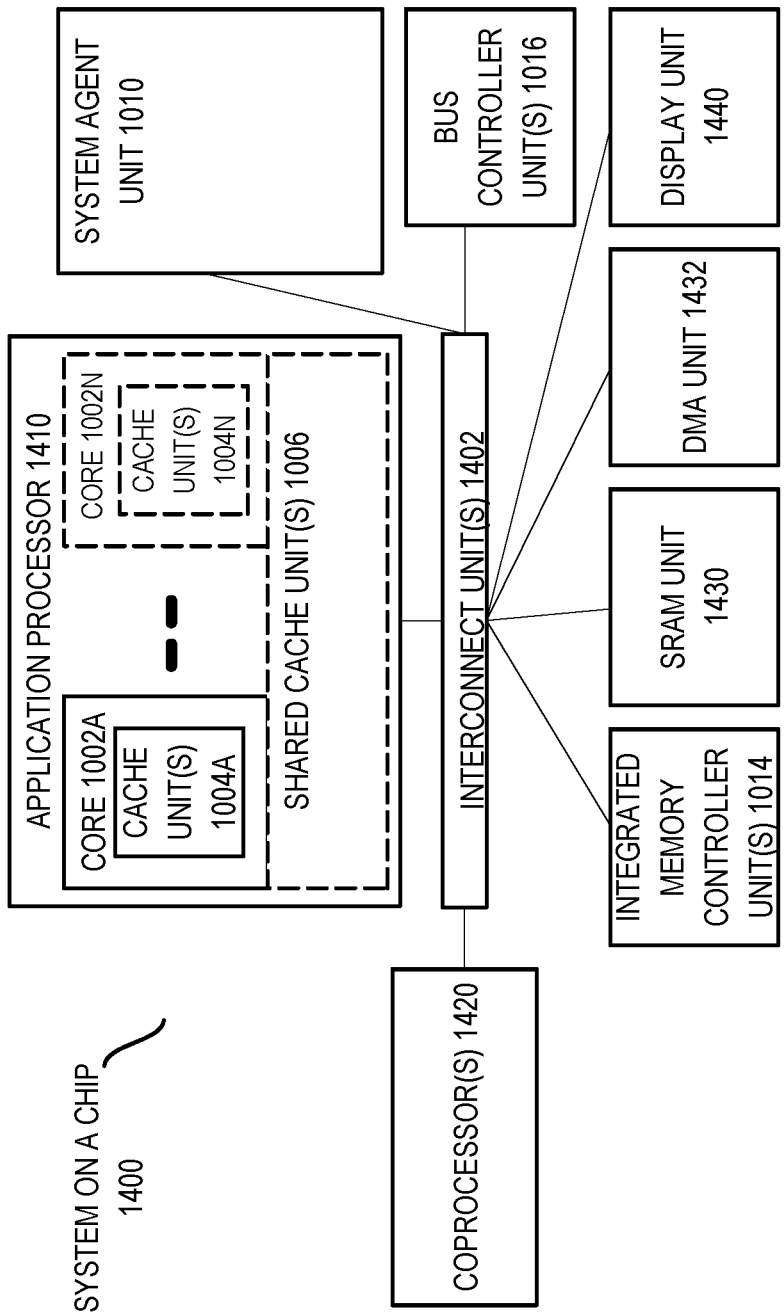

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Example 1 is a compute node for providing access to a shared memory, the compute node comprising a fabric interface to couple the compute node to a fabric, and a field programmable gate array (FPGA) coupled to the fabric interface, the FPGA comprising circuitry to configure a shared memory to include a memory region of a second compute node coupled to the fabric interface via the fabric, wherein the circuitry to configure the shared memory includes circuitry to define with a memory map a correspondence of the memory region of the second compute node with a set of addresses of an address space. The FPGA further comprises circuitry to send request to access the shared memory, wherein, based on the memory map, the request is sent to the fabric interface, circuitry to receive from the fabric interface a response to the request, and circuitry to perform a task to be assigned to the FPGA, including processing data of the response to the request, wherein the data is both received and processed at the FPGA independent of any storage of the data, based on the request, to any memory location of the first compute node which is represented in the address space.

In Example 2, the subject matter of Example 1 optionally includes the compute node further comprising a memory including a first memory region, and wherein the memory region of the second compute node is a second memory region, the FPGA further comprising circuitry to configure the shared memory to further include the first memory region, and send via the fabric interface a message to indicate to the second compute node that the shared memory region is to include the first memory region.

In Example 3, the subject matter of any one or more of Examples 1 through 2 optionally includes wherein the task is a first task of multiple tasks performed in parallel, wherein the second compute node is assigned a second task of the multiple tasks.

In Example 4, the subject matter of any one or more of Examples 1 through 3 optionally includes the fabric interface further comprising circuitry to maintain a cache, including circuitry to access a cache line of the cache based on a message received from one of the FPGA and the second compute node.

In Example 5, the subject matter of Example 4 optionally includes wherein the second compute node is to comprise a second fabric interface, wherein the circuitry to maintain the cache includes circuitry to implement a cache coherency protocol with the second fabric interface.

In Example 6, the subject matter of any one or more of Examples 1 through 3 optionally includes wherein one of the FPGA and the fabric interface further comprises circuitry to detect a failure to access the second node via the fabric, and circuitry to send a software interrupt based on the failure.

In Example 7, the subject matter of any one or more of Examples 1 through 3 optionally includes the compute node further comprising one or more processor cores coupled to the FPGA.

In Example 8, the subject matter of any one or more of Examples 1 through 3 optionally includes wherein the first compute node comprises a first memory region other than any memory region of the shared memory, and wherein the memory region of the second compute node is a second memory region.

In Example 9, the subject matter of Example 8 optionally includes wherein the first compute node comprises a third memory region, wherein the FPGA comprises circuitry to configure the shared memory to further include the third memory region, and circuitry to send to the second compute node a message which indicates that the shared memory region is to include the third memory region.

In Example 10, the subject matter of any one or more of Examples 1 through 3 optionally includes the FPGA further comprising circuitry to receive a message indicating an availability of a memory region of the second compute node, wherein the message is received via the fabric, wherein the shared memory is to be configured based on the message.

In Example 11, the subject matter of any one or more of Examples 1 through 3 optionally includes wherein the circuitry to configure the shared memory includes circuitry to configure the shared memory to further include a memory region of a memory node coupled to the compute node via the fabric, wherein the memory node which omits any compute logic.

Example 12 is a non-transitory computer-readable storage medium having stored thereon instructions which, when executed, perform a method comprising with a field programmable gate array (FPGA) of a first compute node, configuring a shared memory to include a memory region of a second compute node coupled to a fabric interface of the first compute node via a fabric, wherein configuring the shared memory includes defining with a memory map a correspondence of the memory region of the second compute node with a set of addresses of an address space, and sending from the FPGA a request to access the shared memory, wherein, based on the memory map, the request is sent to the fabric interface. The method further comprises communicating from the fabric interface to the FPGA a response to the request, and performing a task assigned to the FPGA, including processing data of the response to the request, wherein the data is both received and processed at the FPGA independent of any storage of the data, based on the request, to any memory location of the first compute node which is represented in the address space.

In Example 13, the subject matter of Example 12 optionally includes wherein the first compute node comprises a first memory region, and wherein the memory region of the second compute node is a second memory region, the method further comprising configuring the shared memory to further include the first memory region, and sending to the second compute node a message indicating that the shared memory region is to include the first memory region.

In Example 14, the subject matter of any one or more of Examples 12 through 13 optionally includes wherein the task is a first task of multiple tasks performed in parallel, wherein the second compute node is assigned a second task of the multiple tasks.

In Example 15, the subject matter of any one or more of Examples 12 through 14 optionally includes method further comprising maintaining a cache with the fabric interface, including accessing a cache line of the cache based on a message received from one of the FPGA and the second compute node.

In Example 16, the subject matter of Example 15 optionally includes wherein the second compute node comprises a second fabric interface, wherein maintaining the cache includes implementing a cache coherency protocol with the second fabric interface.

In Example 17, the subject matter of any one or more of Examples 12 through 14 optionally includes the method further comprising detecting a failure to access the second node via the fabric, and based on the detecting, sending a software interrupt from one of the FPGA and the fabric interface.

In Example 18, the subject matter of any one or more of Examples 12 through 14 optionally includes wherein the first compute node further comprises one or more processor cores coupled to the FPGA.

In Example 19, the subject matter of any one or more of Examples 12 through 14 optionally includes wherein the first compute node comprises a first memory region other than any memory region of the shared memory, and wherein the memory region of the second compute node is a second memory region.

In Example 20, the subject matter of Example 19 optionally includes wherein the first compute node comprises a third memory region, the method further comprising configuring the shared memory to further include the third memory region, and sending to the second compute node a message indicating that the shared memory region is to include the third memory region.

In Example 21, the subject matter of any one or more of Examples 12 through 14 optionally includes the method further comprising receiving a message indicating an availability of a memory region of the second compute node, wherein the message is received via the fabric, wherein the configuring the shared memory is based on the message.

In Example 22, the subject matter of any one or more of Examples 12 through 14 optionally includes the method further comprising configuring the shared memory to further include a memory region of a memory node coupled to the compute node via the fabric, wherein the memory node which omits any compute logic.

Example 23 is a system for providing access to a shared memory, the system comprising an interconnect fabric, a first compute node, and a second compute node comprising a fabric interface coupled to the second compute node via the interconnect fabric, and a field programmable gate array (FPGA) coupled to the fabric interface, the FPGA comprising circuitry to configure a shared memory to include a memory region of a first compute node coupled to the fabric interface via the interconnect fabric, wherein the circuitry to configure the shared memory includes circuitry to define with a memory map a correspondence of the memory region of the first compute node with a set of addresses of an address space. The FPGA further comprises circuitry to send request to access the shared memory, wherein, based on the memory map, the request is sent to the fabric interface, circuitry to receive from the fabric interface a response to the request, and circuitry to perform a task to be assigned to the FPGA, including processing data of the response to the request, wherein the data is both received and processed at the FPGA independent of any storage of the data, based on the request, to any memory location of the first compute node which is represented in the address space.

In Example 24, the subject matter of Example 23 optionally includes the second compute node further comprising a memory including a first memory region, and wherein the memory region of the first compute node is a second memory region, the FPGA further comprising circuitry to configure the shared memory to further include the first memory region, and send via the fabric interface a message to indicate to the first compute node that the shared memory region is to include the first memory region.

In Example 25, the subject matter of any one or more of Examples 23 through 24 optionally includes wherein the task is a first task of multiple tasks performed in parallel, wherein the first compute node is assigned a second task of the multiple tasks.

In Example 26, the subject matter of any one or more of Examples 23 through 25 optionally includes the fabric interface further comprising circuitry to maintain a cache, including circuitry to access a cache line of the cache based on a message received from one of the FPGA and the first compute node.

In Example 27, the subject matter of Example 26 optionally includes wherein the first compute node is to comprise a second fabric interface, wherein the circuitry to maintain the cache includes circuitry to implement a cache coherency protocol with the second fabric interface.

In Example 28, the subject matter of any one or more of Examples 23 through 25 optionally includes wherein one of the FPGA and the fabric interface further comprises circuitry to detect a failure to access the second node via the interconnect fabric, and circuitry to send a software interrupt based on the failure.

In Example 29, the subject matter of any one or more of Examples 23 through 25 optionally includes the second compute node further comprising one or more processor cores coupled to the FPGA.

In Example 30, the subject matter of any one or more of Examples 23 through 25 optionally includes wherein the first compute node comprises a first memory region other than any memory region of the shared memory, and wherein the memory region of the first compute node is a second memory region.

In Example 31, the subject matter of Example 30 optionally includes wherein the first compute node comprises a third memory region, wherein the FPGA comprises circuitry to configure the shared memory to further include the third memory region, and circuitry to send to the first compute node a message which indicates that the shared memory region is to include the third memory region.

In Example 32, the subject matter of any one or more of Examples 23 through 25 optionally includes the FPGA further comprising circuitry to receive a message indicating an availability of a memory region of the first compute node, wherein the message is received via the interconnect fabric, wherein the shared memory is to be configured based on the message.

In Example 33, the subject matter of any one or more of Examples 23 through 25 optionally includes wherein the circuitry to configure the shared memory includes circuitry to configure the shared memory to further include a memory region of a memory node coupled to the compute node via the interconnect fabric, wherein the memory node which omits any compute logic.

Example 34 is a method at a first compute node for providing access to a shared memory, the method comprising with a field programmable gate array (FPGA) of the first compute node, configuring a shared memory to include a memory region of a second compute node coupled to a fabric interface of the first compute node via a fabric, wherein configuring the shared memory includes defining with a memory map a correspondence of the memory region of the second compute node with a set of addresses of an address space. The method further comprises sending from the FPGA a request to access the shared memory, wherein, based on the memory map, the request is sent to the fabric interface, communicating from the fabric interface to the FPGA a response to the request, and performing a task assigned to the FPGA, including processing data of the response to the request, wherein the data is both received and processed at the FPGA independent of any storage of the data, based on the request, to any memory location of the first compute node which is represented in the address space.

In Example 35, the subject matter of Example 34 optionally includes wherein the first compute node comprises a first memory region, and wherein the memory region of the second compute node is a second memory region, the method further comprising configuring the shared memory to further include the first memory region, and sending to the second compute node a message indicating that the shared memory region is to include the first memory region.

In Example 36, the subject matter of any one or more of Examples 34 through 35 optionally includes wherein the task is a first task of multiple tasks performed in parallel, wherein the second compute node is assigned a second task of the multiple tasks.

In Example 37, the subject matter of any one or more of Examples 34 through 36 optionally includes the method further comprising maintaining a cache with the fabric interface, including accessing a cache line of the cache based on a message received from one of the FPGA and the second compute node.

In Example 38, the subject matter of Example 37 optionally includes wherein the second compute node comprises a second fabric interface, wherein maintaining the cache includes implementing a cache coherency protocol with the second fabric interface.

In Example 39, the subject matter of any one or more of Examples 34 through 36 optionally includes the method further comprising detecting a failure to access the second node via the fabric, and based on the detecting, sending a software interrupt from one of the FPGA and the fabric interface.

In Example 40, the subject matter of any one or more of Examples 34 through 36 optionally includes wherein the first compute node further comprises one or more processor cores coupled to the FPGA.

In Example 41, the subject matter of any one or more of Examples 34 through 36 optionally includes wherein the first compute node comprises a first memory region other than any memory region of the shared memory, and wherein the memory region of the second compute node is a second memory region.

In Example 42, the subject matter of Example 41 optionally includes wherein the first compute node comprises a third memory region, the method further comprising configuring the shared memory to further include the third memory region, and sending to the second compute node a message indicating that the shared memory region is to include the third memory region.

In Example 43, the subject matter of any one or more of Examples 34 through 36 optionally includes the method further comprising receiving a message indicating an availability of a memory region of the second compute node, wherein the message is received via the fabric, wherein the configuring the shared memory is based on the message.

In Example 44, the subject matter of any one or more of Examples 34 through 36 optionally includes the method further comprising configuring the shared memory to further include a memory region of a memory node coupled to the compute node via the fabric, wherein the memory node which omits any compute logic.

Techniques and architectures for sharing access to memory resources with multiple FPGAs are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A compute node for sharing memory resources, the compute node comprising:
   a fabric interface to couple the compute node to a fabric;
   and a field programmable gate array (FPGA) coupled to the fabric interface, the FPGA comprising:
      circuitry to configure a shared memory to include a first memory region of a second compute node coupled to the fabric interface via the fabric, wherein the circuitry to configure the shared memory includes circuitry to define with a memory map a correspondence of the first memory region of the second compute node with a set of addresses of an address space;
      circuitry to receive, from an agent external to the FPGA, an assignment of a data processing task to be performed at the FPGA;
      circuitry to generate, based on the assignment, a request to access the shared memory, wherein, based on the memory map, the request is to be sent from the FPGA to the fabric interface;
      circuitry to receive from the fabric interface a response to the request;
      and circuitry to perform an operation of the data processing task, including circuitry to perform a computation with data of the response, wherein the circuitry to perform the operation is to both receive the data and perform the operation without the data first being stored to any physical memory location of the first compute node which is addressable with an address of the address space;
   wherein the fabric interface further comprises circuitry to maintain a cache at the compute node, including circuitry to:
      determine, based on the request, whether the cache includes a cached version of the data;
      and access a cache line of the cache based on a message from one of the FPGA or the second compute node.

2. The compute node of claim 1, further comprising a memory including a second memory region, the FPGA further comprising circuitry to:
   configure the shared memory to further include the second memory region; and send via the fabric interface a message to indicate to the second compute node that the shared memory region is to include the second memory region.

3. The compute node of claim 1, wherein the task is a first task of multiple tasks performed in parallel, wherein the second compute node is assigned a second task of the multiple tasks.

4. The compute node of claim 1, wherein the second compute node is to comprise a second fabric interface, wherein the circuitry to maintain the cache includes circuitry to implement a cache coherency protocol with the second fabric interface.

5. The compute node of claim 1, wherein one of the FPGA or the fabric interface further comprises:
circuitry to detect a failure to access the second node via the fabric; and
circuitry to send a software interrupt based on the failure.

6. The compute node of claim 1, further comprising one or more processor cores coupled to the FPGA.

7. The compute node of claim 1, wherein the compute node comprises a second memory region other than any memory region of the shared memory.

8. The compute node of claim 7, wherein the compute node comprises a third memory region, wherein the FPGA comprises:
circuitry to configure the shared memory to further include the third memory region; and
circuitry to send to the second compute node a message which indicates that the shared memory region is to include the third memory region.

9. The compute node of claim 1, the FPGA further comprising:
circuitry to receive, via the fabric, a message indicating an availability of the first memory region of the second compute node, wherein the FPGA comprises circuitry to configure the shared memory based on the message.

10. The compute node of claim 1, wherein the circuitry to configure the shared memory includes circuitry to configure the shared memory to further include a second memory region of a memory node coupled to the compute node via the fabric, wherein the memory node omits compute logic of any processor or of any FPGA.

11. A non-transitory computer-readable storage medium having stored thereon instructions which, when executed, perform a method comprising:
with a field programmable gate array (FPGA) of a first compute node, configuring a shared memory to include a first memory region of a second compute node coupled to a fabric interface of the first compute node via a fabric, wherein configuring the shared memory includes defining with a memory map a correspondence of the first memory region of the second compute node with a set of addresses of an address space;
receiving at the FPGA, from an agent external to the FPGA, an assignment of a data processing task to be performed at the FPGA;
based on the assignment, generating at the FPGA a request to access the shared memory, wherein, based on the memory map, the request is sent from the FPGA to the fabric interface;
communicating from the fabric interface to the FPGA a response to the request;
performing an operation of the data processing task, including performing a computation with data of the response without the data first being stored to any physical memory location of the first compute node which is addressable with an address of the address space;
and with the fabric interface maintaining a cache at the compute node, including:
based on the request, determining at the fabric interface whether the cache includes a cached version of the data;
and accessing a cache line of the cache based on a message from one of the FPGA or the second compute node.

12. The computer-readable storage medium of claim 11, wherein the first compute node comprises a second memory region, the method further comprising:
configuring the shared memory to further include the second memory region; and
sending to the second compute node a message indicating that the shared memory region is to include the second memory region.

13. The computer-readable storage medium of claim 11, wherein the task is a first task of multiple tasks performed in parallel, wherein the second compute node is assigned a second task of the multiple tasks.

14. The computer-readable storage medium of claim 11, wherein the second compute node comprises a second fabric interface, wherein maintaining the cache includes implementing a cache coherency protocol with the second fabric interface.

15. The computer-readable storage medium of claim 11, the method further comprising:
detecting a failure to access the second node via the fabric; and
based on the detecting, sending a software interrupt from one of the FPGA or the fabric interface.

16. The computer-readable storage medium of claim 11, wherein the first compute node further comprises one or more processor cores coupled to the FPGA.

17. The computer-readable storage medium of claim 11, wherein the first compute node comprises a second memory region other than any memory region of the shared memory.

18. The computer-readable storage medium of claim 17, wherein the first compute node comprises a third memory region, the method further comprising:
configuring the shared memory to further include the third memory region; and
sending to the second compute node a message indicating that the shared memory region is to include the third memory region.

19. The computer-readable storage medium of claim 11, the method further comprising:
receiving a message indicating an availability of the first memory region of the second compute node, wherein the message is received via the fabric, wherein the configuring the shared memory is based on the message.

20. The computer-readable storage medium of claim 11, the method further comprising configuring the shared memory to further include a memory region of a memory node coupled to the first compute node via the fabric, wherein the memory node omits compute logic of any processor or of any FPGA.

21. A system for sharing memory resources, the system comprising:
an interconnect fabric;
a first compute node; and
a second compute node comprising:

a fabric interface coupled to the second compute node via the interconnect fabric; and a field programmable gate array (FPGA) coupled to the fabric interface, the FPGA comprising:

circuitry to configure a shared memory to include a first memory region of the first compute node, wherein the circuitry to configure the shared memory includes circuitry to define with a memory map a correspondence of the first memory region of the first compute node with a set of addresses of an address space;

circuitry to receive, from an agent external to the FPGA, an assignment of a data processing task to be performed at the FPGA;

circuitry to generate, based on the assignment, a request to access the shared memory, wherein, based on the memory map, the request is to be sent from the FPGA to the fabric interface;

circuitry to receive from the fabric interface a response to the request;

and circuitry to perform an operation of the data processing task, including circuitry to perform a computation with data of the response, without the data first being stored to any physical memory location of the second compute node which is addressable with an address of the address space;

wherein the fabric interface further comprises circuitry to maintain a cache at the compute node, including circuitry to:

determine, based on the request, whether the cache includes a cached version of the data; and access a cache line of the cache based on a message from one of the FPGA or the second compute node.

22. The system of claim 21, the second compute node further comprising a memory including a second memory region, the FPGA further comprising circuitry to:

configure the shared memory to further include the second memory region; and send via the fabric interface a message to indicate to the first compute node that the shared memory region is to include the second memory region.

23. The system of claim 21, wherein the task is a first task of multiple tasks performed in parallel, wherein the first compute node is assigned a second task of the multiple tasks.

* * * * *